United States Patent
Childers et al.

(10) Patent No.: US 8,224,953 B2
(45) Date of Patent: *Jul. 17, 2012

(54) METHOD AND APPARATUS FOR REPLAY OF HISTORICAL DATA

(75) Inventors: Sloan Childers, Austin, TX (US); Mike Moran, Austin, TX (US); John Elderton, Austin, TX (US); Mitch Medford, Austin, TX (US)

(73) Assignee: American Power Conversion Corporation, West Kingston, RI (US)

( * ) Notice: Subject to any disclaimer, the term of this patent is extended or adjusted under 35 U.S.C. 154(b) by 1164 days.

This patent is subject to a terminal disclaimer.

(21) Appl. No.: 12/029,042

(22) Filed: Feb. 11, 2008

(65) Prior Publication Data

US 2009/0064046 A1 Mar. 5, 2009

Related U.S. Application Data

(63) Continuation of application No. 10/107,917, filed on Mar. 27, 2002, now Pat. No. 7,330,886, which is a continuation-in-part of application No. 09/429,504, filed on Oct. 27, 1999, now Pat. No. 6,714,977, and a continuation-in-part of application No. 10/057,563, filed on Jan. 25, 2002, now Pat. No. 7,159,022.

(60) Provisional application No. 60/264,445, filed on Jan. 26, 2001, provisional application No. 60/279,059, filed on Mar. 27, 2001, provisional application No. 60/311,268, filed on Aug. 9, 2001.

(51) Int. Cl.
*G06F 15/177* (2006.01)

(52) U.S. Cl. ........................................ 709/224; 715/736

(58) Field of Classification Search .................. 709/224; 715/736

See application file for complete search history.

(56) References Cited

U.S. PATENT DOCUMENTS

| | | | |
|---|---|---|---|
| 3,810,138 | A | 5/1974 | Thompson et al. |
| 4,349,879 | A | 9/1982 | Peddie et al. |
| 4,521,645 | A | 6/1985 | Carroll |
| 4,535,598 | A | 8/1985 | Mount |

(Continued)

FOREIGN PATENT DOCUMENTS

AU 3855395 A1 6/1996

(Continued)

OTHER PUBLICATIONS

Axis Communications, "Axis 200+ and 240 Camera Server: User's Guide", www.axis.com/techsup/cam_servers/cam_240/index.htm, pp. 1-38, Jan. 1999.

(Continued)

*Primary Examiner* — Patrice Winder
(74) *Attorney, Agent, or Firm* — Lando & Anastasi, LLP

(57) ABSTRACT

The invention is directed to a system and method for displaying data associated with network appliances. Icons may be arranged in a display area in accordance with a characteristic associated with the network appliances. This characteristic may be related to location, alarm state, sensor value, or others. Further, the icons may display visual indication associated with network appliance parameters. Moreover, the icons may be superimposed on a graphical element. This element may be a map, blueprint, image, or plot. Further, a set of historical data may be replayed through the display by altering the visual indications of the icons and the graphical element in accordance with a sequence of values contained in the historical data.

20 Claims, 16 Drawing Sheets

U.S. PATENT DOCUMENTS

| | | |
|---|---|---|
| 4,568,934 A | 2/1986 | Allgood |
| 4,636,652 A | 1/1987 | Raes |
| 4,637,020 A | 1/1987 | Schinabeck |
| 4,650,347 A | 3/1987 | Shigemura et al. |
| 4,668,939 A | 5/1987 | Kimura et al. |
| 4,686,450 A | 8/1987 | Pichat |
| 4,718,025 A | 1/1988 | Minor et al. |
| 4,747,041 A | 5/1988 | Engel et al. |
| 4,751,648 A | 6/1988 | Sears, III et al. |
| 4,816,208 A | 3/1989 | Woods et al. |
| 4,823,290 A | 4/1989 | Fasack et al. |
| 4,964,065 A | 10/1990 | Hicks et al. |
| 5,043,807 A | 8/1991 | Rabii |
| 5,061,916 A | 10/1991 | French et al. |
| 5,086,385 A | 2/1992 | Launey et al. |
| 5,097,328 A | 3/1992 | Boyette |
| 5,109,278 A | 4/1992 | Erickson et al. |
| 5,153,837 A | 10/1992 | Shaffer et al. |
| 5,157,732 A | 10/1992 | Ishii et al. |
| 5,168,171 A | 12/1992 | Tracewell |
| 5,189,394 A | 2/1993 | Walter et al. |
| 5,216,623 A | 6/1993 | Barrett et al. |
| 5,220,522 A | 6/1993 | Wilson et al. |
| 5,225,997 A | 7/1993 | Lederer et al. |
| 5,229,850 A | 7/1993 | Toyoshima |
| 5,262,758 A | 11/1993 | Nam et al. |
| 5,289,275 A | 2/1994 | Ishii et al. |
| 5,367,670 A | 11/1994 | Ward et al. |
| 5,382,943 A | 1/1995 | Tanaka |
| 5,395,042 A | 3/1995 | Riley et al. |
| 5,400,246 A | 3/1995 | Wilson et al. |
| 5,404,136 A | 4/1995 | Marsden |
| 5,475,364 A | 12/1995 | Kenet |
| 5,488,430 A | 1/1996 | Hong |
| 5,491,511 A | 2/1996 | Odle |
| 5,508,941 A | 4/1996 | Leplingard et al. |
| 5,528,507 A | 6/1996 | McNamara et al. |
| 5,548,659 A | 8/1996 | Okamoto |
| 5,553,609 A | 9/1996 | Chen et al. |
| 5,561,476 A | 10/1996 | Kershaw et al. |
| 5,566,339 A | 10/1996 | Perholtz et al. |
| 5,572,195 A | 11/1996 | Heller et al. |
| 5,581,478 A | 12/1996 | Cruse et al. |
| 5,586,202 A | 12/1996 | Ohki et al. |
| 5,588,067 A | 12/1996 | Peterson et al. |
| 5,589,764 A | 12/1996 | Lee |
| 5,602,585 A | 2/1997 | Dickinson et al. |
| 5,621,662 A | 4/1997 | Humphries et al. |
| 5,634,002 A | 5/1997 | Polk et al. |
| 5,659,470 A | 8/1997 | Goska et al. |
| 5,664,202 A | 9/1997 | Chen et al. |
| 5,715,160 A | 2/1998 | Plotke |
| 5,731,832 A | 3/1998 | Ng |
| 5,732,074 A | 3/1998 | Spaur et al. |
| 5,742,762 A | 4/1998 | Scholl et al. |
| RE35,793 E | 5/1998 | Halpern |
| 5,768,430 A | 6/1998 | Takashima et al. |
| 5,798,798 A | 8/1998 | Rector et al. |
| 5,805,458 A | 9/1998 | McNamara et al. |
| 5,812,055 A | 9/1998 | Candy et al. |
| 5,818,725 A | 10/1998 | McNamara et al. |
| 5,822,302 A | 10/1998 | Landry, Jr. et al. |
| 5,829,130 A | 11/1998 | Miller |
| 5,860,857 A | 1/1999 | Wasastjerna et al. |
| 5,870,698 A | 2/1999 | Riedel et al. |
| 5,872,931 A | 2/1999 | Chivaluri |
| 5,892,440 A | 4/1999 | Bryan |
| 5,905,867 A | 5/1999 | Giorgio et al. |
| 5,926,210 A | 7/1999 | Hackett et al. |
| 5,937,092 A | 8/1999 | Wootton et al. |
| 5,937,097 A | 8/1999 | Lennon |
| 5,949,974 A | 9/1999 | Ewing et al. |
| 5,955,946 A | 9/1999 | Beheshti et al. |
| 5,963,457 A | 10/1999 | Kanoi et al. |
| 5,968,116 A | 10/1999 | Day, II et al. |
| 5,974,237 A | 10/1999 | Shurmer et al. |
| 5,978,594 A | 11/1999 | Bonnell et al. |
| 5,978,912 A | 11/1999 | Rakavy et al. |
| 5,987,614 A | 11/1999 | Mitchell et al. |
| 5,991,885 A | 11/1999 | Chang et al. |
| 6,001,065 A | 12/1999 | Devito |
| 6,006,171 A | 12/1999 | Vines et al. |
| 6,052,750 A | 4/2000 | Lea |
| 6,055,480 A | 4/2000 | Nevo et al. |
| 6,057,834 A | 5/2000 | Pickover |
| 6,058,434 A | 5/2000 | Wilt et al. |
| 6,078,253 A | 6/2000 | Fowler |
| 6,078,957 A | 6/2000 | Adelman et al. |
| 6,081,606 A | 6/2000 | Hansen et al. |
| 6,085,243 A | 7/2000 | Fletcher et al. |
| 6,088,816 A | 7/2000 | Nouri et al. |
| 6,094,676 A | 7/2000 | Gray |
| 6,100,806 A | 8/2000 | Gaukel |
| 6,104,755 A | 8/2000 | Ohara |
| 6,105,061 A | 8/2000 | Nakai |
| 6,108,782 A | 8/2000 | Fletcher et al. |
| 6,112,235 A | 8/2000 | Spofford |
| 6,115,468 A | 9/2000 | De Nicolo |
| 6,122,603 A | 9/2000 | Budike, Jr. |
| 6,122,639 A | 9/2000 | Babu et al. |
| 6,125,145 A | 9/2000 | Koyanagi et al. |
| 6,138,078 A | 10/2000 | Canada et al. |
| 6,138,249 A | 10/2000 | Nolet |
| 6,139,177 A | 10/2000 | Venkatraman et al. |
| 6,144,770 A | 11/2000 | Lennon |
| 6,148,262 A | 11/2000 | Fry |
| 6,157,943 A | 12/2000 | Meyer |
| 6,160,584 A | 12/2000 | Yanagita |
| 6,160,926 A | 12/2000 | Dow et al. |
| 6,167,406 A | 12/2000 | Hoskins et al. |
| 6,170,007 B1 | 1/2001 | Venkatraman et al. |
| 6,173,323 B1 | 1/2001 | Moghe |
| 6,175,866 B1 | 1/2001 | Holloway et al. |
| 6,175,886 B1 | 1/2001 | Usami |
| 6,175,927 B1 | 1/2001 | Cromer et al. |
| 6,177,884 B1 | 1/2001 | Hunt et al. |
| 6,182,094 B1 | 1/2001 | Humpleman et al. |
| 6,182,157 B1 | 1/2001 | Schlener et al. |
| 6,189,109 B1 | 2/2001 | Sheikh et al. |
| 6,195,018 B1 | 2/2001 | Ragle et al. |
| 6,208,261 B1 | 3/2001 | Olstead |
| 6,208,345 B1 | 3/2001 | Sheard et al. |
| 6,215,404 B1 | 4/2001 | Morales |
| 6,216,956 B1 | 4/2001 | Ehlers et al. |
| 6,219,628 B1 | 4/2001 | Kodosky et al. |
| 6,229,429 B1 | 5/2001 | Horon |
| 6,236,332 B1 | 5/2001 | Conkright et al. |
| 6,246,780 B1 | 6/2001 | Sato |
| 6,259,956 B1 | 7/2001 | Myers et al. |
| 6,266,721 B1 | 7/2001 | Sheikh et al. |
| 6,271,845 B1 | 8/2001 | Richardson |
| 6,281,790 B1 * | 8/2001 | Kimmel et al. ............... 340/506 |
| 6,282,546 B1 | 8/2001 | Gleichauf et al. |
| 6,298,144 B1 | 10/2001 | Pucker, II et al. |
| 6,304,900 B1 | 10/2001 | Cromer et al. |
| 6,311,105 B1 | 10/2001 | Budike, Jr. |
| 6,311,214 B1 | 10/2001 | Rhoads |
| 6,324,644 B1 | 11/2001 | Rakavy et al. |
| 6,329,792 B1 | 12/2001 | Dunn et al. |
| 6,332,202 B1 | 12/2001 | Sheikh et al. |
| 6,338,094 B1 | 1/2002 | Scott et al. |
| 6,338,437 B1 | 1/2002 | Kline et al. |
| 6,343,320 B1 | 1/2002 | Fairchild et al. |
| 6,360,255 B1 | 3/2002 | McCormack et al. |
| 6,363,421 B2 | 3/2002 | Barker et al. |
| 6,363,422 B1 | 3/2002 | Hunter et al. |
| 6,373,840 B1 | 4/2002 | Chen |
| 6,374,296 B1 | 4/2002 | Lim et al. |
| 6,375,614 B1 | 4/2002 | Braun et al. |
| 6,381,700 B1 | 4/2002 | Yoshida |
| 6,389,464 B1 | 5/2002 | Krishnamurthy et al. |
| 6,396,534 B1 | 5/2002 | Mahler et al. |
| 6,400,103 B1 | 6/2002 | Adamson |
| 6,400,996 B1 | 6/2002 | Hoffberg et al. |
| 6,402,691 B1 | 6/2002 | Peddicord et al. |
| 6,404,348 B1 | 6/2002 | Wilfong |
| 6,405,216 B1 | 6/2002 | Minnaert et al. |

| | | | |
|---|---|---|---|
| 6,437,691 B1 * | 8/2002 | Sandelman et al. ......... 340/506 |
| 6,449,745 B1 | 9/2002 | Kim et al. |
| 6,477,667 B1 | 11/2002 | Levi et al. |
| 6,496,105 B2 | 12/2002 | Fisher et al. |
| 6,505,086 B1 | 1/2003 | Dodd et al. |
| 6,505,256 B1 | 1/2003 | York |
| 6,510,350 B1 | 1/2003 | Steem et al. |
| 6,529,230 B1 | 3/2003 | Chong |
| 6,529,936 B1 | 3/2003 | Mayo et al. |
| 6,553,336 B1 | 4/2003 | Johnson et al. |
| 6,553,418 B1 | 4/2003 | Collins et al. |
| 6,591,279 B1 | 7/2003 | Emens et al. |
| 6,611,866 B1 | 8/2003 | Goldman |
| 6,640,145 B2 | 10/2003 | Hoffberg et al. |
| 6,658,595 B1 | 12/2003 | Thamattoor |
| 6,681,787 B2 | 1/2004 | Tinsley et al. |
| 6,686,838 B1 | 2/2004 | Rezvani et al. |
| 6,714,977 B1 | 3/2004 | Fowler et al. |
| 6,718,364 B2 | 4/2004 | Connelly et al. |
| 6,756,998 B1 | 6/2004 | Bilger |
| 6,801,940 B1 | 10/2004 | Moran et al. |
| 6,829,630 B1 | 12/2004 | Pajak et al. |
| 6,990,513 B2 | 1/2006 | Belfiore et al. |
| 7,051,096 B1 | 5/2006 | Krawiec et al. |
| 7,159,022 B2 | 1/2007 | Primm et al. |
| 7,207,041 B2 | 4/2007 | Elson et al. |
| 7,330,886 B2 | 2/2008 | Childers et al. |
| 7,392,309 B2 | 6/2008 | Childers et al. |
| 7,529,838 B2 | 5/2009 | Primm et al. |
| 2001/0005894 A1 | 6/2001 | Fukui |
| 2001/0047213 A1 | 11/2001 | Sepe, Jr. |
| 2001/0047410 A1 | 11/2001 | Defosse |
| 2001/0052006 A1 | 12/2001 | Barker et al. |
| 2001/0055965 A1 | 12/2001 | Delp et al. |
| 2002/0003575 A1 | 1/2002 | Marchese |
| 2002/0023258 A1 | 2/2002 | Elwahab et al. |
| 2002/0041603 A1 | 4/2002 | Kato |
| 2002/0043969 A1 | 4/2002 | Duncan et al. |
| 2002/0071031 A1 | 6/2002 | Lord et al. |
| 2002/0072868 A1 | 6/2002 | Bartone et al. |
| 2002/0083378 A1 | 6/2002 | Nickels |
| 2002/0112054 A1 | 8/2002 | Hatanaka |
| 2002/0124081 A1 | 9/2002 | Primm et al. |
| 2002/0152298 A1 | 10/2002 | Kikta et al. |
| 2002/0161885 A1 | 10/2002 | Childers et al. |
| 2002/0174223 A1 | 11/2002 | Childers et al. |
| 2003/0098789 A1 | 5/2003 | Murakami et al. |
| 2003/0204756 A1 | 10/2003 | Ransom et al. |
| 2004/0160897 A1 | 8/2004 | Fowler |
| 2004/0163102 A1 | 8/2004 | Fowler et al. |
| 2007/0088823 A1 | 4/2007 | Fowler et al. |
| 2008/0263150 A1 | 10/2008 | Childers et al. |
| 2009/0064046 A1 | 3/2009 | Childers et al. |
| 2009/0121860 A1 | 5/2009 | Kimmel et al. |
| 2009/0164031 A1 | 6/2009 | Johnson et al. |

FOREIGN PATENT DOCUMENTS

| | | |
|---|---|---|
| AU | 5601198 A1 | 7/1998 |
| AU | 0016673 A5 | 6/2000 |
| AU | 777375 | 10/2004 |
| CA | 2300053 | 2/1999 |
| CA | 2310275 | 6/1999 |
| CA | 2328939 | 9/1999 |
| CA | 2395450 | 5/2001 |
| CN | 87100353 | 9/1988 |
| CN | 1294350 | 5/2001 |
| EP | 0444997 B1 | 2/1991 |
| EP | 0591585 B1 | 4/1994 |
| EP | 0738065 A1 | 3/1996 |
| EP | 0744112 A1 | 11/1996 |
| EP | 0859489 A2 | 1/1998 |
| EP | 0978780 A1 | 8/1998 |
| EP | 0917034 A1 | 10/1998 |
| EP | 0917034 B1 | 10/1998 |
| EP | 0963076 A3 | 5/1999 |
| EP | 0964551 A1 | 6/1999 |
| EP | 0927933 A2 | 7/1999 |
| EP | 0977112 A2 | 7/1999 |
| EP | 0956680 A1 | 11/1999 |
| EP | 1014622 A2 | 12/1999 |
| EP | 0990986 A2 | 4/2000 |
| EP | 0992100 A2 | 4/2000 |
| EP | 1002268 A1 | 5/2000 |
| EP | 1009130 A | 6/2000 |
| EP | 1032884 A1 | 9/2000 |
| EP | 1049291 A1 | 11/2000 |
| EP | 1115264 A2 | 12/2000 |
| EP | 1124301 A2 | 12/2000 |
| EP | 1096724 A | 5/2001 |
| EP | 1107519 | 6/2001 |
| EP | 1142289 A1 | 10/2001 |
| EP | 1150188 A2 | 10/2001 |
| EP | 1178628 A2 | 2/2002 |
| GB | 9826895 | 1/1999 |
| GB | 9913682 | 8/1999 |
| GB | 2335124 | 9/1999 |
| GB | 2343036 | 4/2000 |
| GB | 2344718 | 6/2000 |
| GB | 2351205 | 12/2000 |
| GB | 2355163 | 4/2001 |
| GB | 2359369 | 8/2001 |
| HU | 9300145 | 8/1993 |
| JP | 3099398 A2 | 4/1991 |
| JP | 5040889 A2 | 2/1993 |
| JP | 6105376 | 4/1994 |
| JP | 6119581 A2 | 4/1994 |
| JP | 07270459 | 10/1995 |
| JP | 8307541 A2 | 11/1996 |
| JP | 11164035 A | 6/1999 |
| JP | 11219388 A2 | 8/1999 |
| JP | 11338666 | 12/1999 |
| JP | 2000092092 A2 | 3/2000 |
| JP | 2000134606 A2 | 5/2000 |
| JP | 2000151606 A2 | 5/2000 |
| JP | 2000209204 A2 | 7/2000 |
| JP | 2000278773 A2 | 10/2000 |
| TW | 0443058 B | 6/2001 |
| TW | 0448349 B | 8/2001 |
| WO | 9521506 | 8/1995 |
| WO | 9615615 | 5/1996 |
| WO | 9730879 | 8/1997 |
| WO | 9801838 | 1/1998 |
| WO | 9826541 | 6/1998 |
| WO | 9908183 | 2/1999 |
| WO | 9915950 | 4/1999 |
| WO | 9927456 | 6/1999 |
| WO | 9945445 | 9/1999 |
| WO | 0035177 | 6/2000 |
| WO | 0039724 | 7/2000 |
| WO | 0054557 | 9/2000 |
| WO | 0073866 A1 | 12/2000 |
| WO | 0079500 A1 | 12/2000 |
| WO | 0101366 A2 | 1/2001 |
| WO | 0108396 | 2/2001 |
| WO | 0127763 A1 | 4/2001 |
| WO | 0131849 | 5/2001 |
| WO | 0157631 A1 | 8/2001 |
| WO | 0161665 A2 | 8/2001 |
| WO | 0169405 A1 | 9/2001 |
| WO | 0169504 A1 | 9/2001 |
| WO | 0179935 A1 | 10/2001 |
| WO | 0157477 C1 | 11/2001 |
| WO | 0182028 A2 | 11/2001 |
| WO | 0193042 A2 | 12/2001 |
| WO | 0193508 A1 | 12/2001 |
| WO | 0197907 A2 | 12/2001 |
| WO | 0199402 A2 | 12/2001 |
| WO | 0201877 A1 | 1/2002 |
| WO | 0211391 A2 | 2/2002 |
| WO | 0169405 C1 | 3/2002 |
| WO | 0233980 | 4/2002 |
| WO | 0237280 A2 | 5/2002 |
| WO | 0079500 C2 | 6/2002 |
| WO | 0247044 | 6/2002 |
| WO | 0247369 A1 | 6/2002 |
| WO | 0248830 A2 | 6/2002 |
| WO | 0249285 A1 | 6/2002 |
| WO | 02060124 A2 | 8/2002 |

| | | |
|---|---|---|
| WO | 02060124 A3 | 8/2002 |
| WO | 02093403 | 11/2002 |
| WO | 02099683 | 12/2002 |

OTHER PUBLICATIONS

Axis Communications, "Network Camera Developments Enable Live Web Imaging", Axis 2100 white paper, www.axis.com/products/videso/camera/documentation.htm, pp. 1-12, Nov. 1999.

Axis Communications, "Axis 2400/2401 Administration Manual Version 1.1", www.axis.com/techsup/cam_servers/cam_2400/index.htm, version 1.1.xx, part No. 16741, pp. 1-78, Jul. 1999.

Duran et al., "Virtual personal computers and the portable network," IEEE Proceedings of Inter. Performance, Computing, and Communications, IPCCC'99, p. 52-56, Feb. 1999.

Fossum, "CMOS image sensors; electronioc camera-on-a-chip", IEEE Transactions on Electron Devices, vol. 44, iss. 10, pp. 1689-1698, Oct. 1997.

Hochhauser, M., "Netbotz Wallbotz 400 is the next best thing to being there", CMP Media, Inc., Network Computing, v 13, n. 2, p. 1-2, Jan. 2002.

Sinetica Corp., "Newsletter, Issue One 99", Sinetica, UK, www.sinetica.co.uk, Feb. 1999, XP002160504, 4 pp.

Sinetica Corp., "Netcom TH. Advanced SNMP Agent with Web Browser Support", Sinetica, UK, www.sinetica.co.uk, Apr. 2000, XP002160505, 2 pp.

International Search Report from corresponding International Application No. PCT/US00/29689 (dated Feb. 28, 2001).

International Preliminary Examination Report from corresponding International Application No. PCT/US00/29689.

Office Action from corresponding Canadian Patent Application No. 2,395,450, dated May 2, 2008.

International Search Report from International Application No. PCT/US02/09179 (dated Aug. 22, 2002).

International Search Report from International Application No. PCT/US02/09178 (dated Sep. 4, 2002).

International Search Report from International Application No. PCT/US02/02326 (dated Jan. 10, 2003).

European Search Report from European Patent Application No. EP 04 75 0067 (dated Apr. 24, 2007).

* cited by examiner

METHOD AND APPARATUS FOR REPLAY OF HISTORICAL DATA

RELATED APPLICATIONS

This application is a continuation of U.S. patent application Ser. No. 10/107,917, filed Mar. 27, 2002, now U.S. Pat. No. 7,330,886 entitled "METHOD AND APPARATUS FOR REPLAY OF HISTORICAL DATA." U.S. patent application Ser. No. 10/107,917 is a continuation-in-part of U.S. patent application Ser. No. 09/429,504, now U.S. Pat. No. 6,714,977, and a continuation-in-part of 10/057,563, now U.S. Pat. No. 7,159,022. U.S. patent application Ser. No. 09/429,504, was filed on Oct. 27, 1999 and entitled "METHOD AND SYSTEM FOR MONITORING COMPUTER NETWORKS AND EQUIPMENT." U.S. patent application Ser. No. 10/057,563, filed on Jan. 25, 2002 and entitled "METHOD AND SYSTEM FOR A SET OF NETWORK APPLICANCES WHICH CAN BE CONNECTED TO PROVIDE ENHANCED COLLABORATION, SCALABILITY AND RELIABILITY," claims priority of U.S. provisional Application No. 60/264,445, filed Jan. 26, 2001, entitled "METHOD AND SYSTEM FOR A SET OF NETWORK APPLICANCES WHICH CAN BE CONNECTED TO PROVIDE ENHANCED COLLABORATION, SCALABILITY AND RELIABILITY." U.S. patent application Ser. No. 10/107,917 claims priority to U.S. provisional Application No. 60/279,059, filed Mar. 27, 2001 entitled "NETWORK APPLIANCE MANAGEMENT", and to U.S. provisional Application No. 60/311,268, filed Aug. 9, 2001 entitled "METHODS FOR DISPLAYING PHYSICAL NETWORK TOPOLOGY AND ENVIRONMENTAL STATUS BY LOCATION, ORGANIZATION, OR REPONSIBLE PERSON." Each of the above applications is incorporated herein by reference in its entirety.

TECHNICAL FIELD OF THE INVENTION

This invention relates in general to a method and apparatus for displaying data. More specifically, this invention relates to replaying historical data associated with network appliances.

BACKGROUND OF THE INVENTION

Remote monitoring of locations and equipment has become important in many applications. In one example, remote monitoring of networking equipment improves security, prevents equipment failure, and aids in maintaining network operability.

However, many typical systems for monitoring remote locations and equipment suffer from deficiencies associated with displaying and representing data to end-users. End-users are typically limited to a tabular view of values with few visual clues as to the meaning of those values. Further, these views are typically static and only represent a present value.

With such systems, alarms may be missed. Further, users may not notice trending values until an alarm or damage has occurred.

In addition, such display methods make analysis of trends and causality difficult. Failure to understand the cause of a failure or alarm may lead to repeated damage and costly equipment failures.

As such, many typical monitoring systems suffer from deficiencies in representing data. Many other problems and disadvantages of the prior art will become apparent to one skilled in the art after comparing such prior art with the present invention as described herein.

SUMMARY OF THE INVENTION

Aspects of the invention are found in a display apparatus. The display apparatus may arrange icons associated with network appliances in a display area. These icons may be arranged in accordance with a characteristic of the network appliances. This characteristic may be a sensor value, type or version of network appliance, or physical location, among others. Further, the icon may exhibit one or more visual indications relating to a parameter. The parameter may, for example, be a sensor reading, alarm state, or network appliance status, among others. In addition, the icon may display alpha-numeric values of associated parameters.

The icons may be superimposed on a graphic element. The graphic element may, for example, be a map, blueprint, image, or plot, among others. For example, the icons may be arranged according to location. The graphical element may be a map to indicate location. Alternately, the location may be a location with in a room or building and the graphical element may be a blueprint of the room or building. In another exemplary embodiment, the graphical element may be a contour plot indicating variances in sensor values throughout a room. Alternately, the graphical element may be a vector plot.

In addition, the display may replay a set of historical data. The display may update the visual appearance of the icons, the arrangement of the icons, and the graphical element, among others, in response to a progression through the historical data.

Further aspects of the invention may be found in a method for displaying data associated with network appliances. The method may include arranging icons in a display area. These icons may be arranged in accordance with a characteristic of the network appliances. This characteristic may be a sensor value, type or version of network appliance, or physical location, among others. Further, the icon may exhibit one or more visual indications relating to a parameter. The parameter may, for example, be a sensor reading, alarm state, or network appliance status, among others. In addition, the icon may display alpha-numeric values of associated parameters.

The method may also include rendering a graphical element upon which the icons are superimposed. The graphical element may take the form of those embodiments described above, among others. Further, the method may include replaying historical data associated with the network appliances. This replaying may include updating the visual appearance of the icons, the arrangement of the icons, and the graphical element, among others, in response to a progression through the historical data.

As such, a system for displaying data associated with network appliances is described. Other aspects, advantages and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

Corresponding reference numerals indicate corresponding parts throughout the several views of the drawings.

DETAILED DESCRIPTION OF THE PREFERRED EMBODIMENT

Figure 1:
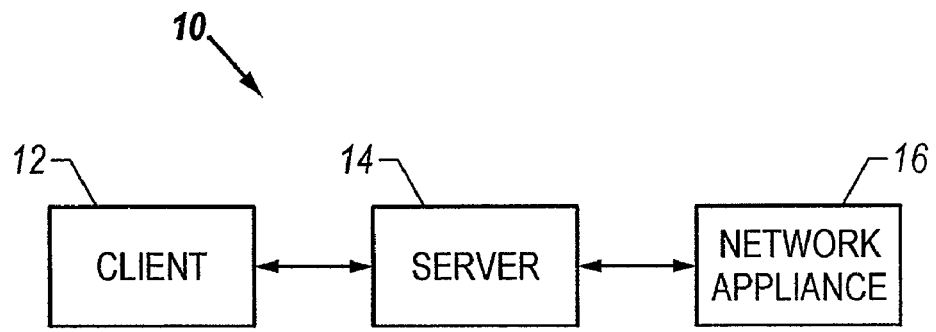
FIG. 1 is a schematic block diagram of a system, according to the invention.

FIG. 1 is a schematic block diagram of the system according to the invention. The system 10 has a server, a client 12 and a network appliance 16. The server 14 is connected to one or more network appliances 16 through an interconnected network. The server 14 may function to transfer sensor data from the network appliance 16 and transfer configuration data to the network appliances 16. The server 14 is also connected to a client machine 12. The client machine 12 may access, display and/or manipulate data stored on the server 14. In this manner, the client 12 may remotely monitor network appliances 16 and the client 12 may reconfigure the network appliances 16.

The client 12 may be connected to the server 14 through an interconnected network. Further, the server 14 may be connected to the network appliance 16 through an interconnected network. The interconnected network may take various forms. These forms may include a global network, wide area network, local area network, wireless network, phone systems, and satellite communications systems, among others. Further, these networks and systems may use various method, protocols, and standards, including, among others, ethernet, wireless ethernet, TCP/IP, HTTP, FTP, SNMP, Blue Tooth, and others. In addition, various security methods may be used in transferring data, including SSL, among others. Further, a user-controlled level of security may be provided. A standard protocol may allow the client and server to be physically located on separate sides of a firewall, adding another level of security to the customer.

In addition, the client 12 may acquire instructions for accessing, displaying and manipulating data from the server 14. These instructions may also be transferred by the server from the server 14 on an as needed basis.

In one exemplary embodiment, the server 14 may communicate with one or more network appliances 16. The one or more network appliances 16 may be located in a server room. The one or more network appliances 16 may have sensors for sensing environmental conditions and security states of the server room.

For example, the network appliances 16 may collect data associated with temperature, humidity, door sensors, alarms, power quality, motion detectors and cameras, among others. The network appliances 16 may, for example, communicate with the server 14 through hypertext transfer protocols. In one exemplary embodiment, the network appliances 16 are connected to an interconnected network, such as a local area network, wide area network, global network, and wireless network, among others. The network may, for example, use a TCP/IP protocol communications method. The network appliances 16 may, for example, communicate with the server 14 using a hypertext transfer protocol.

For example, the network appliances 16 may ping a server 14 with an HTTP method communication. The server 14 may respond to that HTTP ping method communication with data associated with the configuration of the network appliance 16. Alternately, the network appliances 16 may use the HTTP method communication to transfer data to the server 14. In one embodiment, the network appliance 16 may use an HTTP Post method to send information relating to alarms and alerts. Some alarms and/or alerts may have associated image data which may be stored on the server 14. Furthermore, the server may associate the image data with the alert. Alerts delivered via HTTP Posts may allow other appliances to communicate and deliver information to servers that cannot initiate communications with the Appliances, for example, due to firewalls or intermittent network connectivity. This approach may provide superior reliability, security, and connectivity to conventional SNMP alert delivery.

The HTTP Post method may also be used to implement periodic posting of data from the network appliance to the server. The end-user may also configure appliances to periodically deliver their sensor data to the present invention, "pushing" the data to the server instead of having the server "pull" the data from the appliance. This mechanism allows the server to collect and record data from appliances that it is not capable of initiating communications with, such as appliances located behind a fully blocking firewall to inbound network requests. The delivery of this data may be set to require a user-id and password, allowing the present invention to authenticate the delivered data. The same transactions used for communicating the current sensor values and states may be used to verify status. If the delivery of the data is significantly overdue (i.e. by some period of time, or some number of scheduled Posts are missing), the Server will declare the Appliance "offline" or "missing in action".

In another embodiment, the server 14 may communicate with the network appliance 16 using an HTTP Get call. However, the server 14 and network appliances 16 may use various communications methods. These methods may include file transfer protocol, hypertext transfer protocol, SNMP, among others. Further, the communications may include messages associated with HTML, XML, HTTP post, HTTP get, compressed data, and image data, among others. The communication may occur on intervals. These intervals may be fixed periodically, vary with date or time, be adjustable, or any combination, among others. In addition, timeouts and retries may be configured.

Further, the server may attempt to find network appliances through discovery. For example, the server may attempt to communicate with each possible address in a given IP address range. In addition, it may attempt to communicate with each of a specified set of ports that the user has configured the HTTP servers on their appliances to use.

The ability to schedule a discovery or collect environmental sensor data during a control window makes life easier for network administrators to reduce network management traffic during peak hours. This approach may allow the user to configure which days of the week to scan for their appliances, as well as what time of day to do the scan. This feature may also allows the user to find appliances located at network sites that are only "dialed up" during certain scheduled times of days, without wasting time and effort attempting to discover them when they are not connected to the central site.

The present invention supports an arbitrary number of discovery policies, allowing discovery to be fine-tuned for multiple sites and different customer policies.

The system may also support "discovering" appliances by handling Appliance-initiated HTTP Posts. When an Appliance issues a Post to the Server, the server will determine if the Appliance is one already managed by the Server. If not, the Appliance will be automatically added, either unconditionally or if it meets certain criteria configured by the user (i.e. only devices on certain subnets, certain models, or matching membership criteria for certain Groups (see 3.9)). The Server's response to the Post may be used to tell the Appliance how often to check-in in the future (if it is accepted) or to not Post again in the future (if it is rejected), among others.

The server 14 may communicate with a client machine 12. For example, the client machine 12 and server 14 may be coupled to an interconnected network. The interconnected network may take various forms. These forms may include global networks, local area networks, wide area networks, wireless networks, phone switching networks, and others. Further, these networks may use various protocols, such as TCP/IP.

In one exemplary embodiment, the client machine 12 may communicate with the server 14 using hypertext transfer protocols. For example, the client machine 12 may have a web browser that communicates with the server 14. The web browser may be a JAVA enabled browser. For example, a JAVA enabled browser may download an applet from the server 14. The applets may enable the client machine to access, display, and/or manipulate data stored on the server 14. For example, the client machine 12 may be able to access information associated with sensor data, configuration data, image data, network appliance status, and map configuration data, among others. In one exemplary embodiment, the client machine 12 may query the server using SQL to retrieve the desired data. However, various other methods may be used to retrieve data.

The client machine 12 may then display the data in various formats including tables, maps, and graphs, among others. Furthermore, the client 12 may, in one exemplary embodiment, dynamically load JAVA programming object classes for viewing, accessing, and/or manipulating various data. Most of the HTTP replies returned from the server are in plain ASCII text. However there are several situations where binary transfers of Java Objects are far more efficient. For these scenarios, a Network Class Loader may be implemented so the server can create complex return-objects for the client. Since the client may be relatively small, a mechanism may provide the underlying Object code to the client before it receives the Object itself. The Network Class Loader is that solution. In other words, the client can make a request to the server and receive both an Object containing data, and the code necessary to decode and execute the returned Object within the client's application environment.

This feature may further enhance the ability of third-party developers (both end-user and ISVs) to extend the present invention, since the definitions of these interfaces and the classes returned can be published without requiring the ISV to include potentially obsolete versions of the class implementations in their delivered code (since the up-to-date versions will be served to the application from the present invention using the Network Class Loader). For compression purposes, returned objects from the server may utilize the Object serialization standard put forth by Sun Microsystems in the Java Runtime Environment.

The client machine 12 may also manipulate and organize data. In one exemplary embodiment, the client machine 12 may establish dynamic groups, organized by chain of command, business infrastructure, or physical location, among others. These groups may be displayed in a tree structure. Further, these groupings may, for example, be implemented using dynamically created queries.

However, the client machine may have various embodiments. Furthermore, the client machine may communicate with the server 14 through various protocols. These protocols may include FTP, HTTP, SNMP, among others. In an alternate embodiment, the client machine 12 may contain software. The software may be functional to acquire and load various programming objects and classes. The software may also be written in various languages such as JAVA, C++, Visual Basic, among others.

The server 14 may also communicate to the client machine 12 an alert associated with storage capacity. Further, the server 14 may implement automated backup.

Figure 2A:
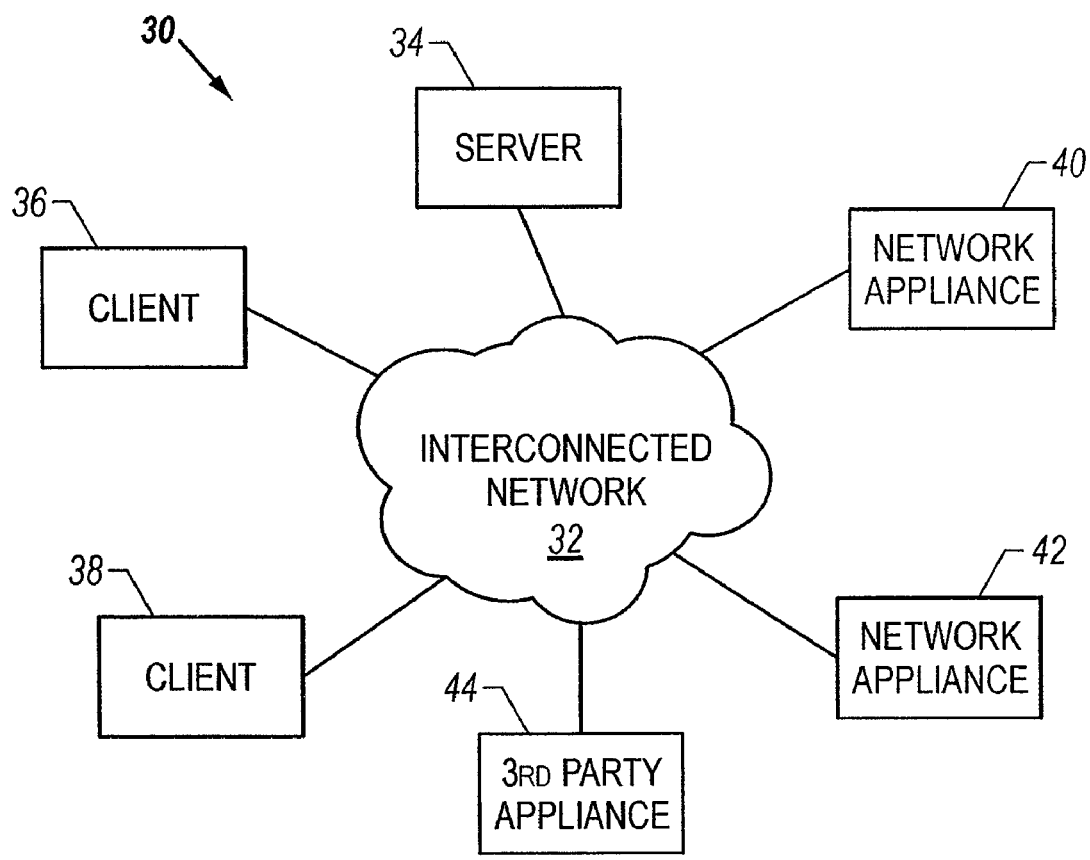
FIG. 2A is a schematic block diagram of an exemplary embodiment of the system as seen in FIG. 1.

FIG. 2A is a schematic block diagram of an exemplary embodiment of the system as seen in FIG. 1. The system 30 may have a server 34 connected to an interconnected network 32. In addition, the system 30 may have client machines 36, 38, network appliances 40, 42, or third party appliances 44 connected to a network 32, among others. The server 34 may function to store information associated with the network appliances. This information may include sensor data, configuration data, image data and map configuration files, among others. The data or information may be down loaded by the server 34 from the network appliances 40, 42. Alternately, the network appliances 40, 42 may transfer data or information to the server 34 through the interconnected network 32.

Furthermore, the server may acquire data from a third party appliance 44 through the interconnected network 32. A server 34 may store, group and organize the information and data. Further, the server may supply the information to one or more client machines 36, 38, through the interconnected network 32.

One or more client machines 36, 38, may communicate with the server 34 through an interconnected network 32. The clients 36, 38 may access data, display, and manipulate data, among others. Furthermore, the clients 36, 38 may acquire instructions and/or programs associated with accessing the data from the server 34.

However, the server 34, the network appliances 40, 42, the third party appliance 44 and the clients 36, 38 may or may not be connected to the same interconnected network. Moreover, these elements may be configured separately, together, or in various combinations, among others.

Figure 2B:
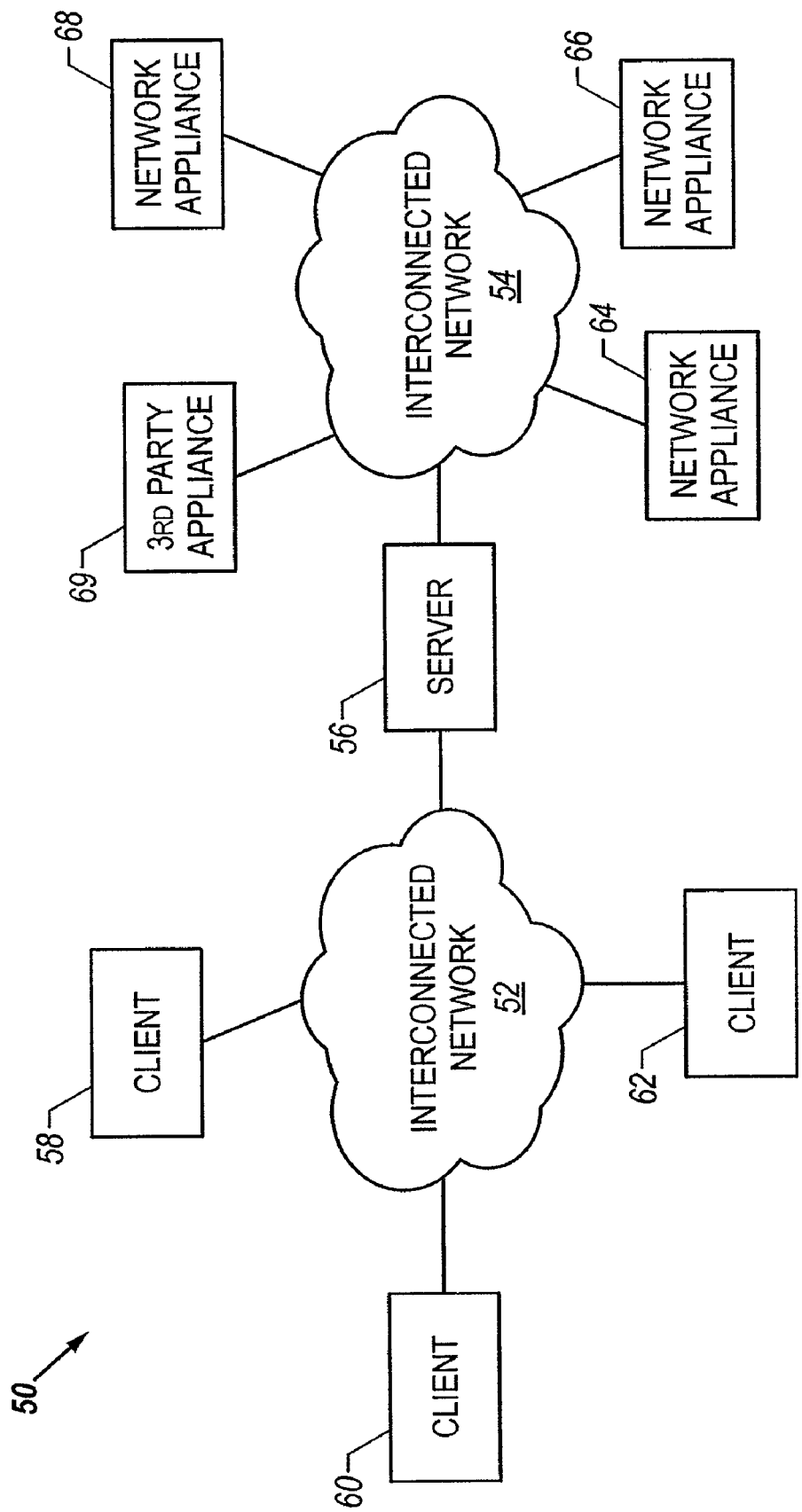
FIG. 2B is a schematic block diagram of an exemplary embodiment of the system as seen in FIG. 1.

For example, FIG. 2B is a schematic block diagram of an exemplary embodiment of the system as seen in FIG. 1. The system has a server connected to two interconnected networks 52, 54. The interconnected network 52 also connects to client machines 58, 60, and 62. The interconnected network 54 may connect to one or more network appliances 64, 66, 68, and/or third party appliances 69. A server 56 may transfer information to and from the one or more appliances 64, 66, 68 and/or the third party appliances 69 through the interconnected network 54. This information may be sensor data, configuration data, and images, among others.

The server 56 may store the information and supply that information to client machines 58, 60, 62. The client machines 58, 60, 62 may, for example, access, display and/or manipulate the data associated with the network appliances 64, 66, 68 and third party appliances 69. Further, the client machines 58, 60, 62 may acquire from the server 56, instructions, objects, classes, and programs, among others, for accessing, displaying and manipulating the data associated with the network appliances 64, 66, 68 and third party appliances 69, as stored on the server 56.

Figure 2C:
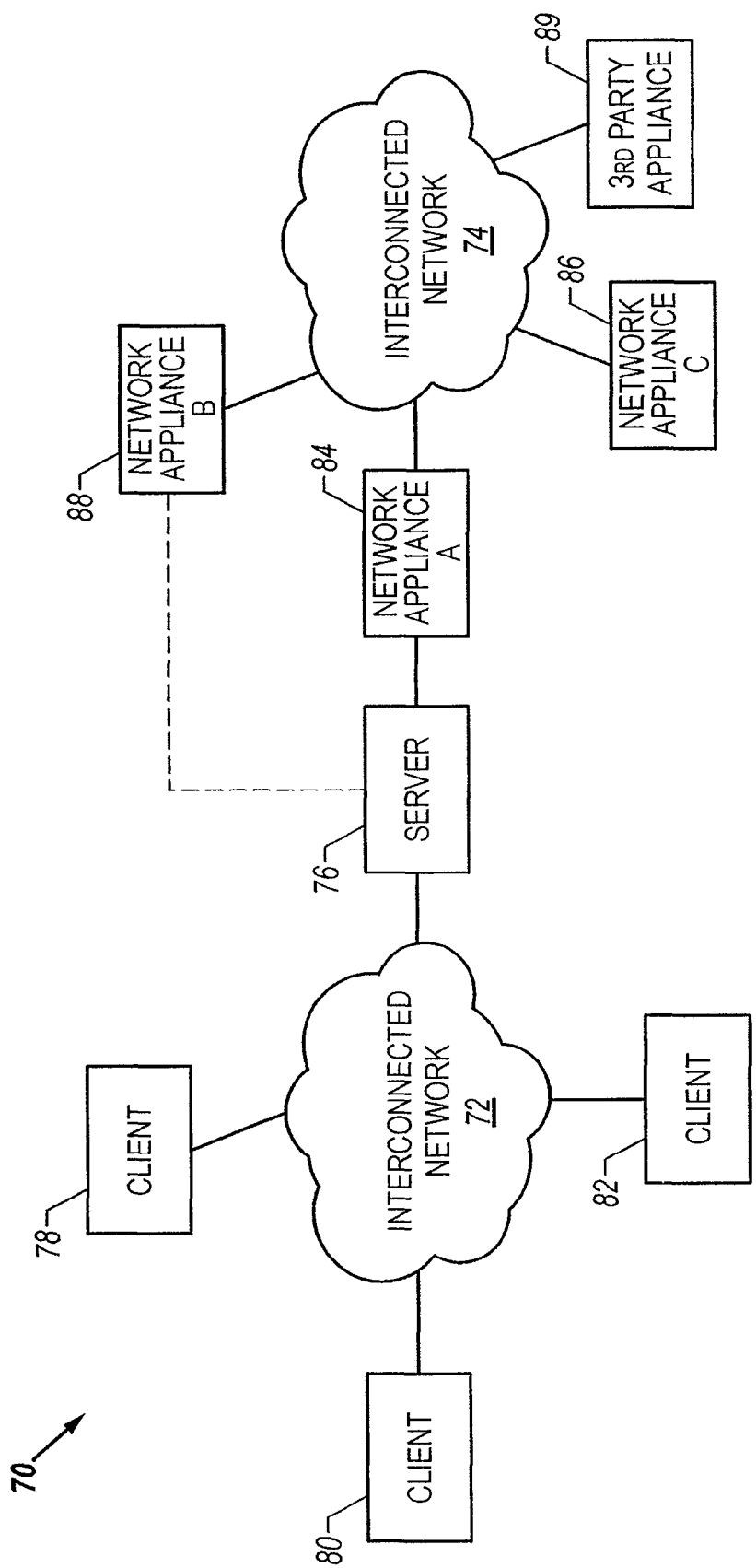
FIG. 2C is a schematic block diagram of an exemplary embodiment of the system as seen in FIG. 1.

Further, FIG. 2C is a schematic block diagram of a further exemplary embodiment of the system as seen in FIG. 1. The system 70 has a server 76. The server 76 may be connected to a network appliance A 84 or optionally connected to a network appliance B 88. Network appliance A 84 and network appliance B 88 may be connected to an interconnected network 74. In addition, network appliance 86 and a third party appliance 89 may be connected to the interconnected network 74. The server 76 may be connected to the network appliance A 84 through various means. These means may include a global network, wide area network, local area network, wireless network, phone systems, and satellite communications systems, among others. Further, these networks and systems may use various method, protocols, and standards, including, among others, ethernet, wireless ethernet, TCP/IP, HTTP, FTP, SNMP, Blue Tooth, and others.

In addition, the server 76 may be connected to network appliance B 88 through various means. These means may include a global network, wide area network, local area network, wireless network, phone systems, and satellite communications systems, among others. Further, these networks and systems may use various method, protocols, and standards, including, among others, ethernet, wireless ethernet, TCP/IP, HTTP, FTP, SNMP, Blue Tooth, and others.

Moreover, the server 76 may be connected to network appliance A 84 and network appliance B 88 through the same, different, or various combinations, among others, of interconnected communication methods.

In addition, the server 76 may be connected to one or more client machines 78, 80 82 through an interconnected network 72. The client machines 78, 80, 82, may, through the interconnected network 72, access, display, and manipulate data associated with the network appliances 84, 86, 88 and/or third party appliances 89 as stored on the server 76. Furthermore, the client machines 78, 80, 82 may acquire from the server 76, instructions, objects, and classes, among others, for accessing, displaying and manipulating data as stored on the server 76.

The server 76 may store data associated with the network appliances 84, 86, 88 and third party appliances 89. This information may include sensor data, configuration data, map configuration data, groupings and associations, accessibility information, and image data, among others. The server, may, for example, communicate with network appliance A 84 to transfer the data. Alternately, the server 76 may communicate with network appliance B 88 to transfer the data. In one exemplary embodiment, network appliance A 84 may act as an intermediate between network appliances 86, 88, third party appliances 89 and the server 76. Network appliance A 84 may function as an intermediary by storing a directory of data, acting as a proxy, or acting as a data reciprocal, among others.

However, the elements as seen in FIGS. 2A, 2B and 2C may configured in various combinations, together or separate, among others. As such, various configurations may be envisaged.

Figure 3:
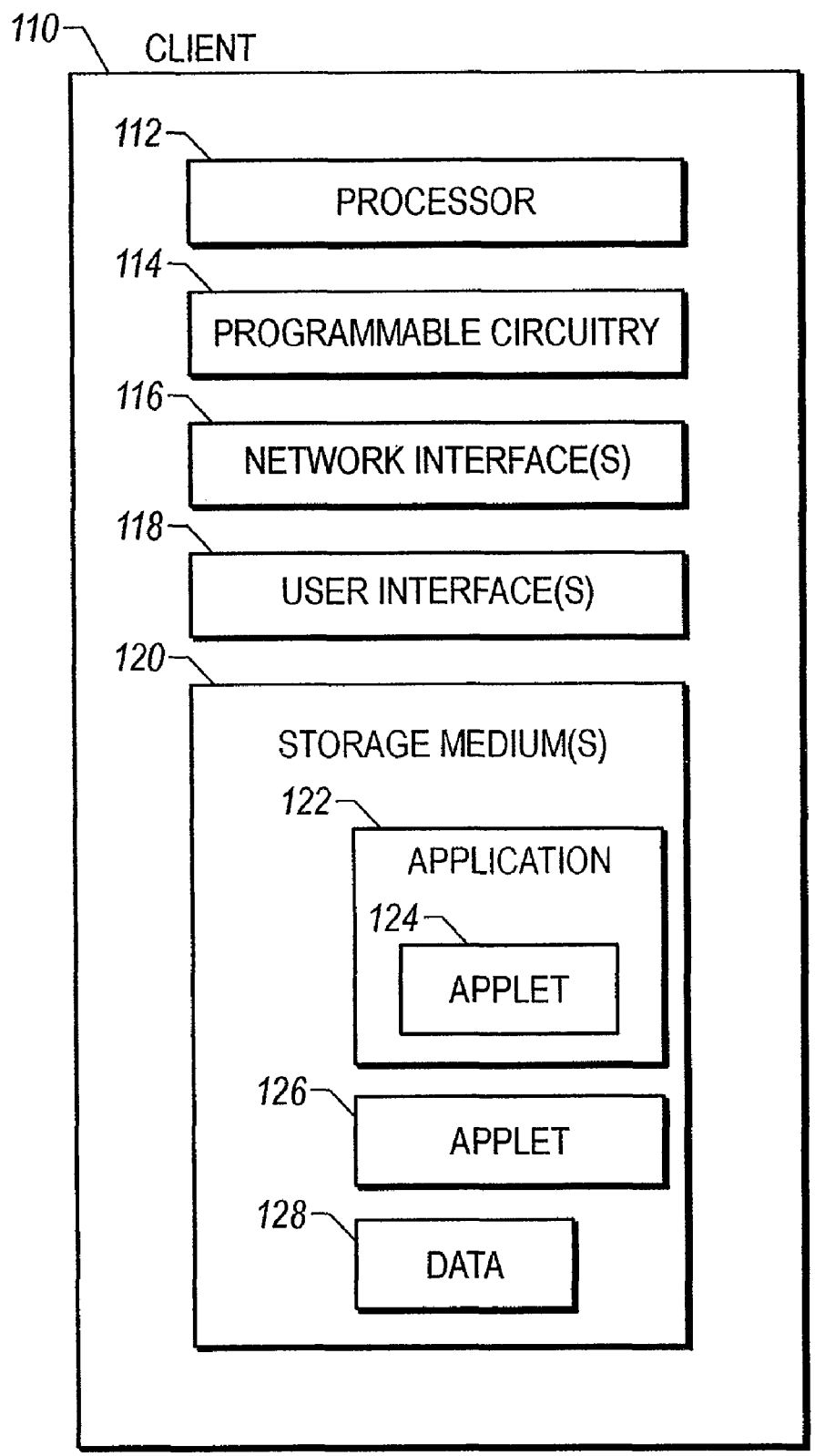
FIG. 3 is a block diagram of an exemplary embodiment of a client machine as seen in FIG. 1.

FIG. 3 shows an exemplary embodiment of a client machine as seen in FIG. 1. The client machine 110 may have a processor 112, programmable circuitry 114, one or more network interfaces 116, one or more user interfaces 118, and storage mediums 120, among others. A storage mediums 120 may store application data. Further the storage mediums may store downloaded data and information 128. However, the client 110 may have various configurations. These elements may or may not be included. Further, these elements may be separate, together, or in various combinations, among others.

The processor 112 may function to interpret the instructions and application data. The processor may take various forms. These forms may include CPUs, embedded processors, JAVA enabled processors, and various computational circuitry, among others. Further, the processor may operate with an operating system such as Windows 95, Windows 98, Windows 2000, Windows ME, Windows NT, Windows CE, Linux, Unix, BSD, MacOS 9.x, MacOS X, Sun OS, PALM, or a Java-based operating system, among others.

The programmable circuitry 114 may take various forms. These forms may enable a user to program the client machine 110 using various interfaces such as a keyboard, mouse, network, drive, and handheld circuitry, among others.

The network interfaces may take various forms. These forms may include various circuitry for communicating through ethernet, wireless ethernet, Blue Tooth, phone lines, and modems, among others.

User interfaces may take various forms. These forms may include monitors, keyboards, wireless devices, handheld devices, and a mouse, among others.

The storage mediums 120 may take various forms. These forms may include hard drives, floppy drives, removable drives, cards, CD-ROM, CD-RW, CD-R, DVD, DVD-R, DVD-RW, RAM, and flash memory, among others.

The storage mediums 120 may store various applications 122, applets 126 and or data 128. The client 110 may function, for example, to access, display and manipulate data stored on a server and associated with network appliances. The client may use installed applications to access, display and manipulate the data. Alternately, the client may download applications, applets, and object classes, among others, to access, display, and/or manipulate the data. Furthermore, the client may use various combinations of installed and downloaded application, applets, object classes, among others.

The applications, applets, object classes may take various forms. These forms may include internet browsers, stand alone applications, interpreters, libraries, and instruction sets, among others.

In one exemplary embodiment, the client may connect to a server through a network interface 116. The client may have a JAVA enabled web browser. The web browser may function to acquire an applet from the server through the network interface 116. The applet may function to enable access to the data, display the data in various forms, and enable manipulation of the data. The client may manipulate data on the server to alter map configurations, network appliance associations, accessibility and permission information, annotate data associated with events, and network application configuration data, among others.

Further, the applet or applets may also function to permit changing and/or manipulation of configuration data associated with network appliances. For example, one or more parameters associated with one or more network appliances may be changed. A parameter associated with several network appliances may be changed to a same value for each network appliance. Alternately, a single value may be changed associated with a single parameter of a single network appliance. Furthermore, configuration settings may be uploaded to the server for future implementation on the network appliances.

The applet or applets may enable the client machine to display data. For example, the applet or applications may display a map. The map may have icons associated with the network appliances. Further, these icons may be used to display representations of the data. These icons may also be superimposed on a graphic, image, map or plot, among others. Further, the icons may be arranged according to type, location, alarm state, configuration, parameter value, or organization, among others. Alternately, the applications or applets may display the data as a table. For example, the table may display a current value of a parameter associated with a sensor on or connected to a network appliance. Alternately, the table may display alarm states associated with network appliances. Further, the table may display configuration parameters and data associated with network appliances. The table may further enable manipulation and changing of the values within the table. Alternately, the data may be displayed in graphical forms. These graphs may additionally offer the ability to chart data associated with one or more sensors associated with one or more network appliances. However, various other display methods may be envisaged. The applications or applets may also function to dynamically download data objects, classes, program elements, useful for accessing, displaying and/or manipulating new data elements. For example, a network class loader may be implemented in an application or applet such that new data classes may be implemented. These may, for example, be written in JAVA.

The applications and/or applets may also function to display image data. The image data may, for example, be associated with events, network appliances, and sensor data, among others. The applet or applets may display the image data in association with the events, network appliances, and/or sensor data.

In one exemplary embodiment, the client machine 110 may be a personal computer running an operating system such as, for example, Windows 2000. The client machine 110 may, for example, have a browser such as Internet Explorer and be Java enabled. However, various other browsers or application may be used.

In another exemplary embodiment, the client machine may be a handheld device with an operating system such as PALM or WINDOWS CE and be Java enabled. However, various devices may be envisaged. In addition, various operating systems and computer languages may be used.

In this manner, a client machine 110 may have fully functional access to information stored on the server and associated with network appliances. Further, the client may function to view, create, and manipulate groupings of network appliances. The client machine 110 may function to establish permissions to groupings.

Figure 4:
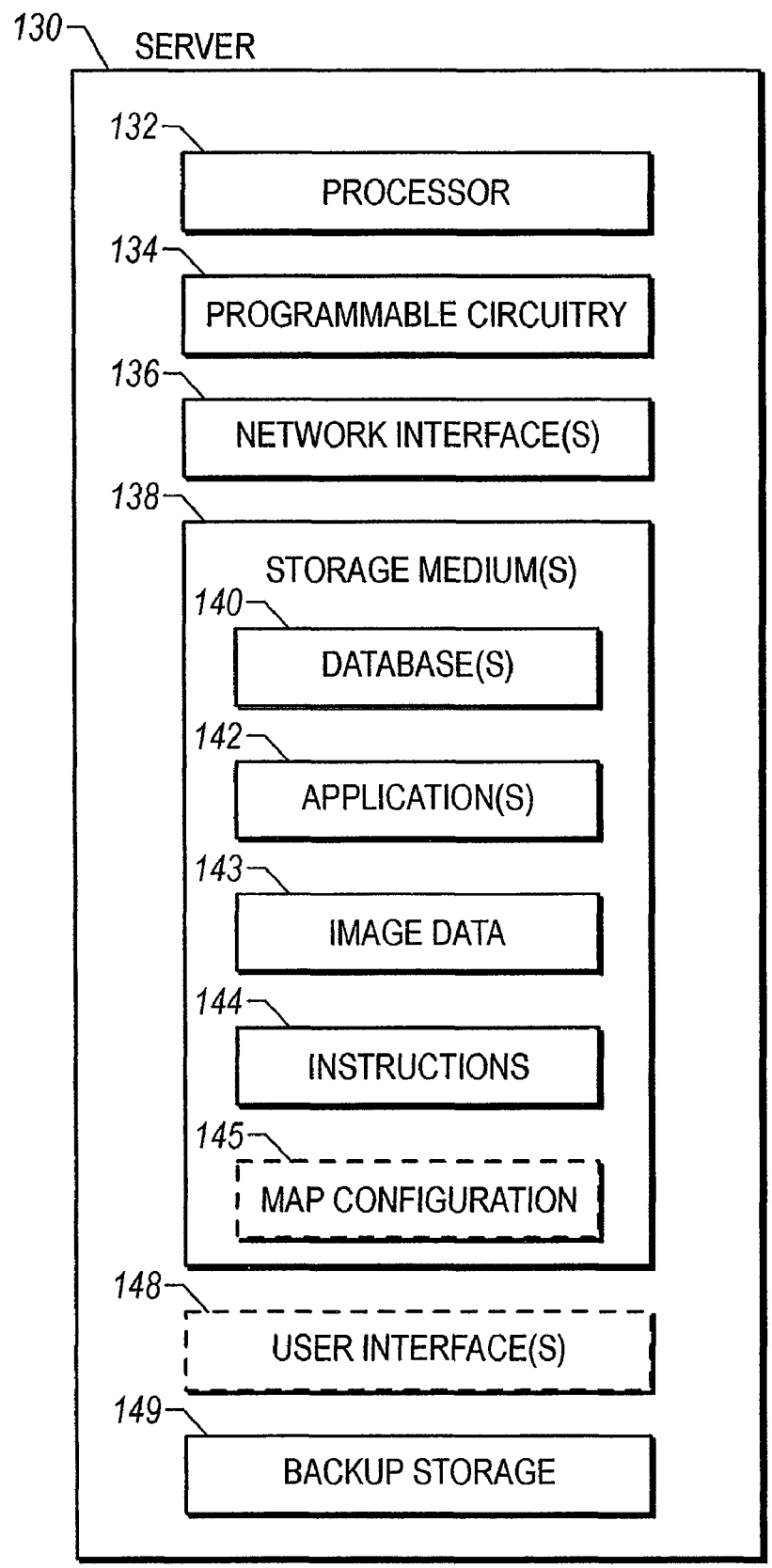
FIG. 4 is a block diagram of an exemplary embodiment of a server as seen in FIG. 1.

FIG. 4 is a block diagram of an exemplary embodiment of a server as seen in FIG. 1. A server 130 may have a processor 132, programmable circuitry 134, network interfaces 136, and storage mediums 138 and user interfaces 148. A storage medium 138 may hold databases 140, applications 142, instructions 144 and map configuration data 146. However, these element may or may not be included. Further, these elements may be separate, together, or in various combinations, among others.

A processor 132 may take various forms. These forms may include CPUs, embedded processors, JAVA enabled processors, and various computational circuitry, among others. Further the processor 132 may operate using an operating system such as Window 2000, Windows NT, Linux, BSD, UNIX, Mac OS X, Mac OS 9.x, or a Java-based operating system, among others.

A programmable circuitry 134 may take various forms. These forms may enable a user to program the server 130 using various interfaces such as a keyboard, mouse, network, drive, and handheld circuitry, among others.

A network interfaces 136 may take various forms. These forms may include various circuitry for communicating through ethernet, wireless ethernet, Blue Tooth, phone lines, and modems, among others.

Storage mediums 138 may take various forms. These forms may include hard drives, floppy drives, removable drives, cards, CD-ROM, CD-RW, CD-R, DVD, DVD-R, DVD-RW, RAM, and flash memory, among others.

The storage mediums 138 may hold databases 140, applications 142, instructions 144 and map configuration data 146. The databases 140 may take various forms. These forms may include Oracle databases, SQL compatible databases, Jet databases, generic databases, tables, and spreadsheets, among others. The map configuration data 146 may also be stored in a database 140. The instructions 144 may take various forms. These forms may include compiled code, interpreted code, Java code, Visual Basic code, C++ code, HTML code, PHP code, and Perl, among others.

The user interfaces 148 may take various forms. These forms may include monitors, keyboards, wireless devices, handheld devices, and a mouse, among others.

The server may function to download data from network appliances through the network interfaces 136. The data may, for example, be stored in the databases 140. This data may be sensory data, configuration data, image data, among others. Further, the server may include applications and instructions for communicating with the network appliances.

A server 130 may also function to communicate with one or more client machines through the network interface or interfaces 136. The server 130 may transfer applications 142 to the client machine. These applications and instructions may enable the client machine 110 to retrieve, display, and/or manipulate data. These applications may also be delivered in parts, classes, or software objects on an as needed basis.

In one exemplary embodiment, a client machine may request an application from the server. The server may deliver at least part of the application to the client machine. For example, a browser on the client machine may request a Java applet. The Java applet may enable the client machine to access, display and manipulate data. For example, the applet may enable the client to organize and group network appliance data, develop user groups, change user access information, display maps, manipulate icons and map features, change network appliance configurations, display alarms, and annotate data, among others. Further, the client machine may store information on the server.

For example, the server may deliver an application enabling the client to access the database and display image data associated with a camera enabled network appliance. Alternately, the server may deliver a part of an application enabling the client to display a table of network appliances and their associated parameters such as a value of a sensor or an alarm state, among others. Further, the server may deliver a part of an application which displays a tree of network appliances associated into groups.

The server may also deliver an application and associated map configuration data. The application may enable the client to access and display a map. The map may have icons superimposed on a background image. The icons may represent network appliances or groupings of network appliances. Further, the icons may link to present or historical values of the network appliances associated with the icons. In addition, an action such as clicking an icon may initiate another display such as another map, table, or graph. The icons may have an appearance indicative of type, capabilities, status, alarm state, present or historical value of a parameter or sensor output, or responsible party, among others. The icons may be arranged in a manner indicative of physical location, type, capabilities, status, alarm state, present or historical value of a parameter or sensor output, or responsible party, among others. Moreover, the background image may be a picture, video image, graph, contour plot, and vector plot, among others. The application may also enable the client machine to manipulate user access data stored on the server. The application may also enable the client machine to store map configuration data on the server 130.

Figure 5:
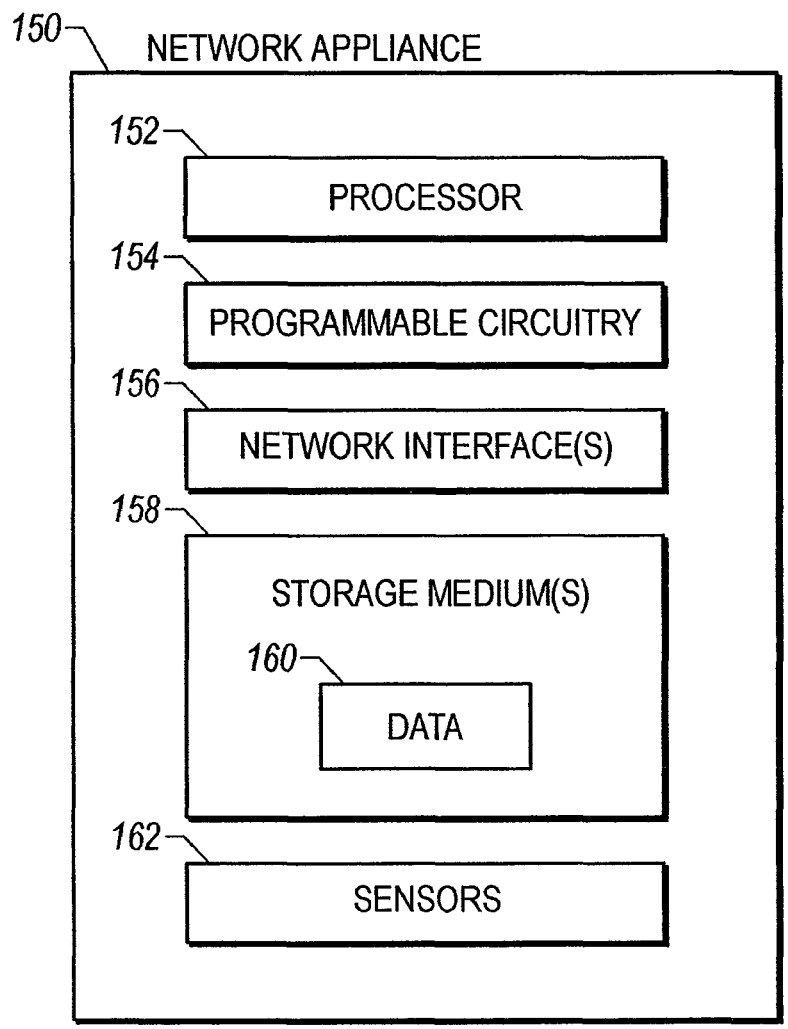
FIG. 5 is a block diagram of an exemplary embodiment of a network appliance as seen in FIG. 1.

FIG. 5 is a block diagram of a network appliance, for use in the system as seen in FIG. 1. The network appliance 150 may have a processor 152, a programmable circuitry 154, one or more network interfaces 156, one or more storage mediums 158, and one or more sensors 162, among others. The storage medium 158 may hold data 160, among others. However, these elements may or may not be included. Further, these elements may be separate, together, or in various configurations, among others.

The processor 152 may take various forms. These forms may include CPUs, embedded processors, JAVA enabled processors, and various computational circuitry, among others.

The programmable circuitry 154 may take various forms. These forms may enable a user to program the network appliance 150 using various interfaces such as a keyboard, mouse, network, drive, and handheld circuitry, among others.

The network interfaces may take various forms. These forms may include various circuitry for communicating through ethernet, wireless ethernet, Blue Tooth, phone lines, and modems, among others. Further, the network interface may enable the network appliance to connect to various networks including global networks, LANs, WANs, phone networks, page networks, satellite communication systems, and wireless networks, among others. The network interface may enable communication between the network appliance 150 and a server and/or other network appliances. Further, the network interface may enable the use of various methods, protocols, and standards, included HTTP, FTP, SNMP, TCP/IP, LDAP, and others.

The storage mediums 158 may take various forms. These forms may include hard drives, floppy drives, removable drives, cards, CD-ROM, CD-RW, CD-R, DVD, DVD-R, DVD-RW, RAM, and flash memory, among others. Further, the storage medium may store data associated with network appliance configuration, sensors, user access, other network appliances, and algorithms, among others.

The sensors 162 may take various forms. These forms may include temperature sensors, pressure sensors, airflow sensors, alarm sensors, dry contact sensors, humidity sensors, cameras, video cameras, infrared cameras, power quality sensors, data traffic sensors, acoustic sensors, and motion sensors, among others.

The network appliance 150 may function to communicate with the server. The communication may, for example, take the form of a ping, an HTTP GET, an HTTP POST, a SNMP message, an email message, or an FTP command, among others. With the communication, the network appliance may upload data, download configuration and/or accessibility settings, download program information, and indicate status. The communication may also use various security protocols and methods. Alternatively, the network appliance 150 may communicate with another network appliance acting as an intermediary between the server and the network appliance 150. As such, the information above may be exchanged between the network appliance 150 and the other network appliance acting as the intermediary. In both cases, the network appliance may deliver data on a schedule, as it is available, in response to a request, in response to an alarm, or in other manners. Further, the data may be formatted in various protocols including HTTP or FTP, among others.

The network appliance 150 may also communicate with other network appliances in a cluster. The cluster of network appliances may use various means for communication including HTTP, SNMP, and FTP, among others. The cluster may also establish relationships, a directory, and share resources, among others.

In one exemplary embodiment, the network appliance may collect image data in response to an open door alarm or motion alarm. The network appliance 150 may then upload the data to a server. The server may then provide the image and the alarm data to a client machine.

In another exemplary embodiment, a client machine may request temperature data from the server, the server may collect the data from the network appliance 150. The server may then forward the data to the client machine.

In a further example, the client machine may alter configuration data. The data may be stored on the server. The network appliance 150 may retrieve the configuration data from the server and adapt.

Figure 6:
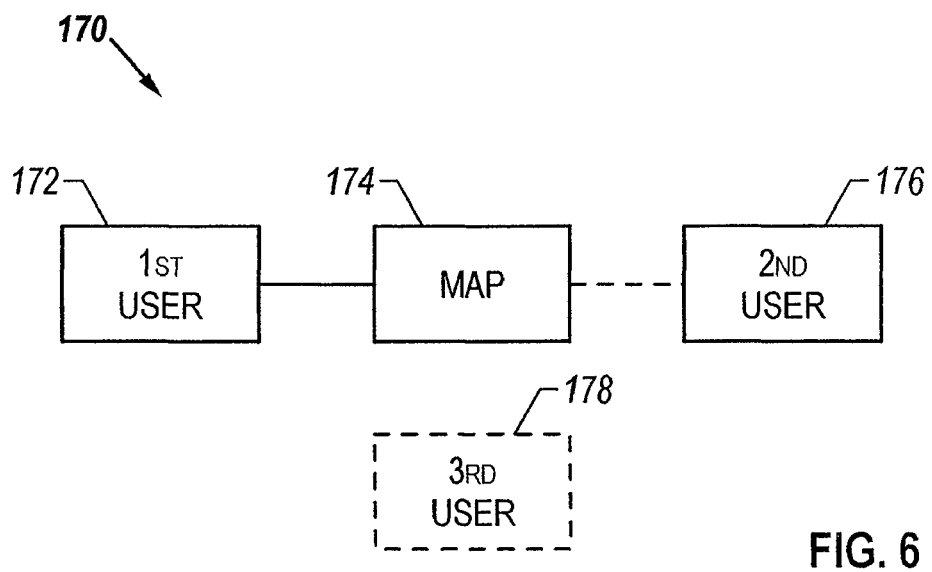
FIG. 6 is a schematic block diagram of an exemplary embodiment of a map configuration, according to the invention.

Turning to methods of displaying and manipulating data, a map configuration may be established and stored on the server. The map configuration may be accessible by various user. In one exemplary embodiment, FIG. 6 is a schematic block diagram of a user association for the map configuration. A first user 172 may create a mapping of icons. The icons may be associated with network appliances. These network appliances may be active or passive devices. Further, the icons may be arranged and/or superimposed on a background image. The first user may establish a permission data. The permission data may for example give a second user 176 access to the map data 174. The second user may be given permission to view or edit the map configuration data, or both. Alternately, the first user may give viewing permission or exclude another user 178.

Additionally, the map view may be "locked" or "unlocked". When "locked", the icons and objects on the view are not movable, preventing accidental or intentional manipulation of the layout. The privilege of "unlocking" of the map view can be restricted, allowing a map to be created and maintained by one user account, and safely shared with other, less privileged, users.

The icons may take various forms. These visual forms may be indicative of type, alarm status, parameter value, capabilities, and version, among others. For example, an icon may have a shape representative of it capabilities, a color representative of a sensor value, a right hand flag with a label, a top flag with a numerical value. In addition, the flags may change color in response to alarm conditions. However, various changes and uses of visual characteristics can be envisaged to represent various data associated with network appliances. Each icon may have some, all, or none of these features.

The icons may also link to other images, displays, and data. For example, the user, through an action such as, for example, clicking on the icon may display another mapping, a data table, and an icon configuration, among others. Furthermore, the user may manipulate the icon configuration and store the configuration on the server.

Figure 7A:
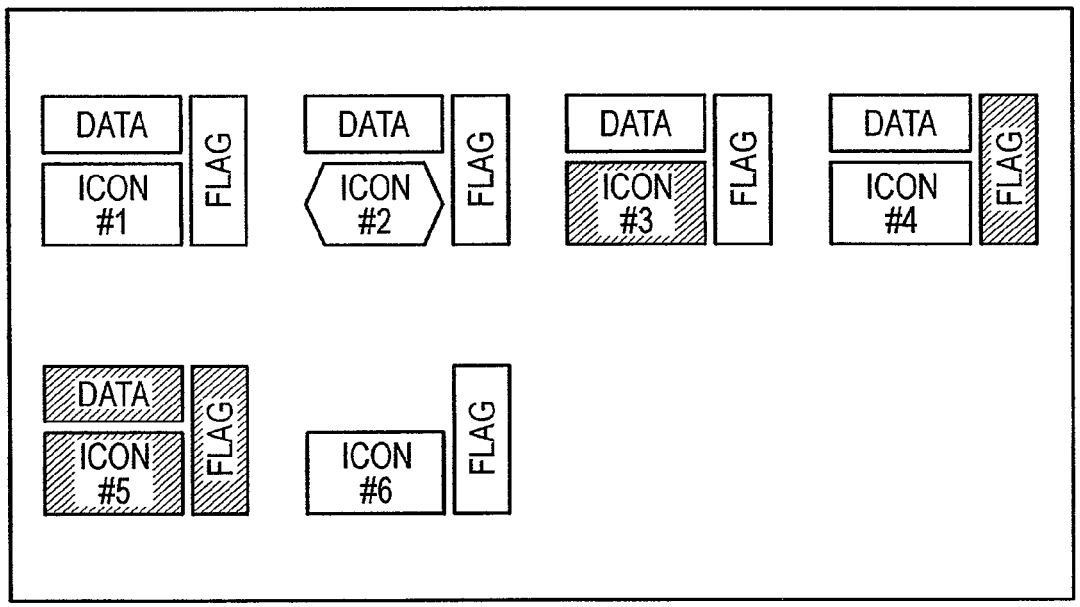
FIG. 7A is a diagram of an exemplary embodiment of a display, according to the invention.
Figure 7B:
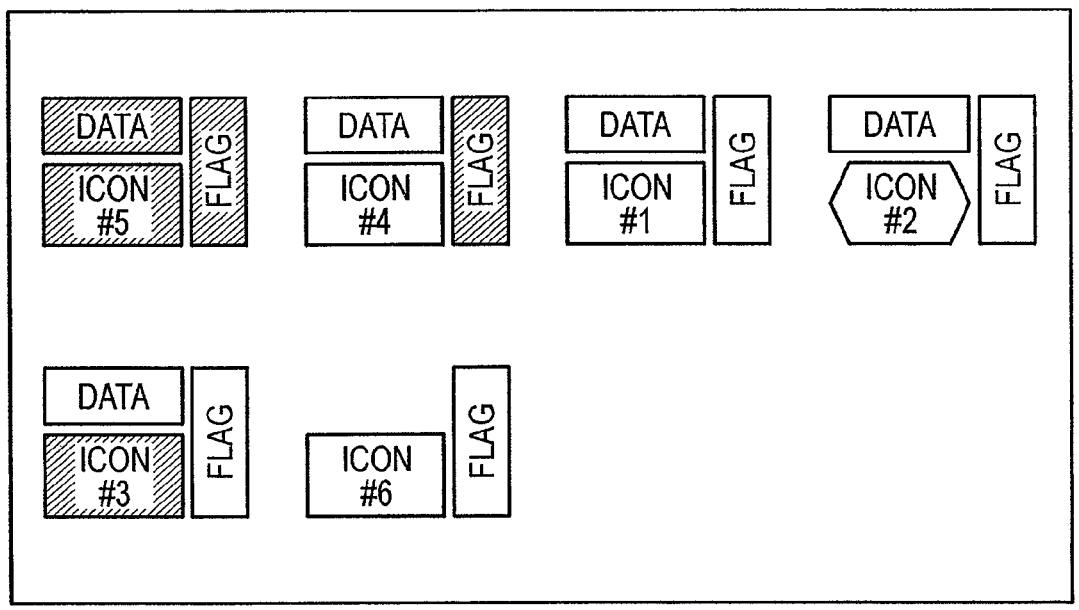
FIG. 7B is a diagram of an exemplary embodiment of a display, according to the invention.
Figure 7C:
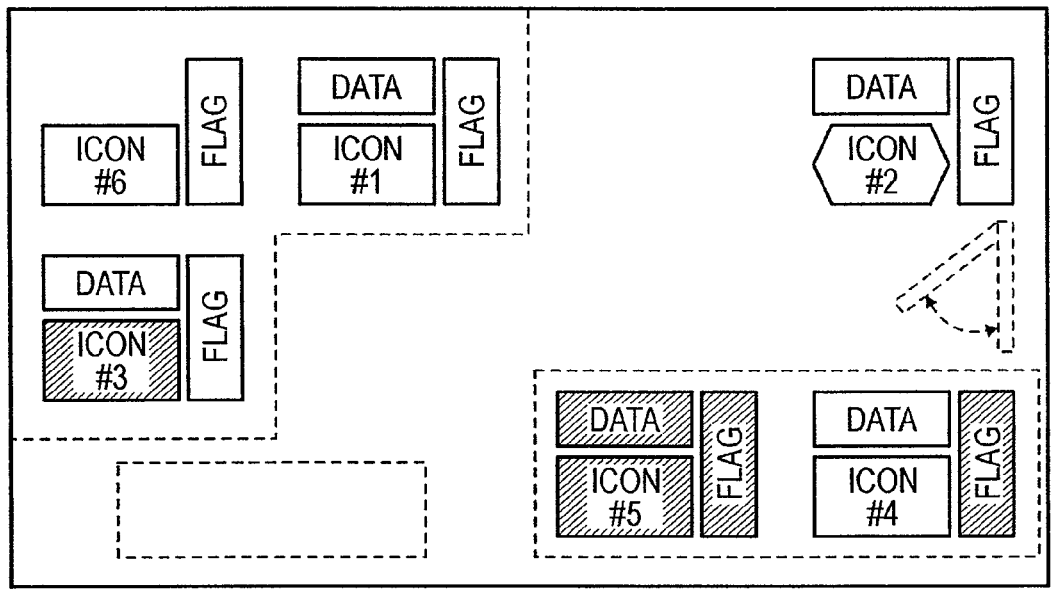
FIG. 7C is a diagram of an exemplary embodiment of a display, according to the invention.
Figure 7D:
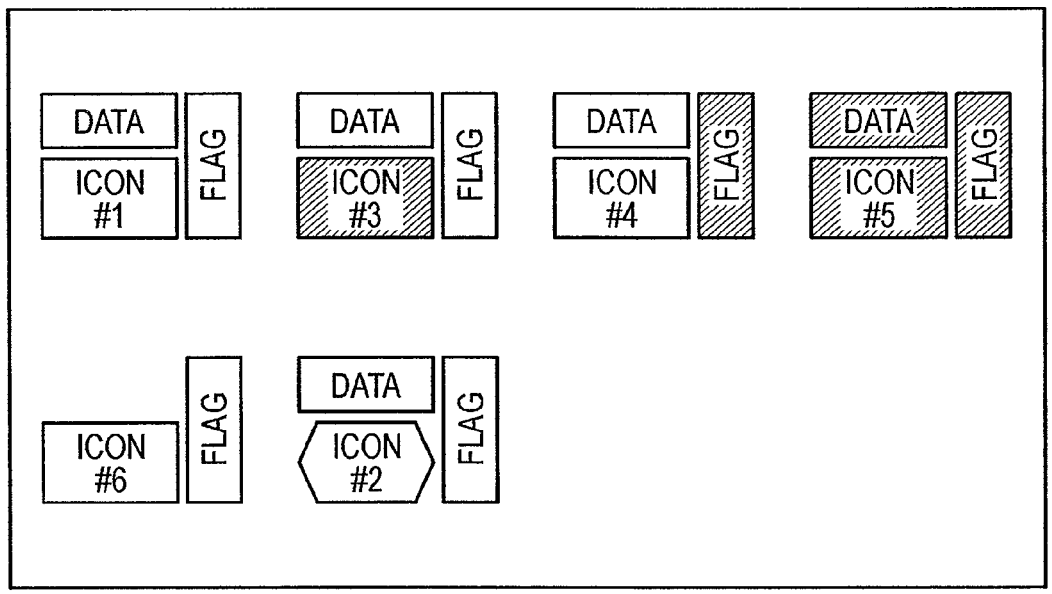
FIG. 7D is a diagram of an exemplary embodiment of a display, according to the invention.

Further, the icons may be arranged in a display in accordance with some characteristic. For example they may be arrange according to a sensor value, an alarm state, a physical location, or randomly, among others. FIG. 7A is schematic block diagram of an exemplary embodiment of a map. The icons may be arranged in a display area. For example, icons associated with a user may be viewed. FIG. 7B is a schematic block diagram of an exemplary embodiment of a map. As shown, the icons may be arranged according to an alarm state as indicated by a shaded flag. Alternately, the icons may be arranged according to physical location as shown in FIG. 7C. For example, the location may be a location within a room, geography, or server rack. Further, the icons may be superimposed on a map or image indicative of the location. The map or image may change in response to events associated with the network appliances. For example an image representing a room may be replaced with a similar image indicating an open door. However, the image may be a picture, video image, plot, graph, blueprint, or map, among others. In another example, the icons may be arranged according to network appliance type, as depicted in FIG. 7D. The shape of the icon may for example represent the type or version. However, various pairings between visual characteristics and data may be envisaged. These map configurations and associated accessibility information may be stored on the server and accessed by the client.

The icons and object displayed on the map view may include both active network devices and passive devices. The ability to add and manipulate the passive devices along with the active network devices may allow the user to accurately represent the physical environment of his equipment rooms, for example. Other exemplary implementations may allow the end-user to import graphical images in a variety of formats (GIF, BMP, JPG, etc) to use as icons customized for their specific equipment (both active and passive).

In one embodiment, a mapping may be associated with a grouping of network appliances. This grouping may, for example, be related to physical location or topology. In one example, environmental sensor readings may be displayed on the map views as part of the icon. The map view may display a single sensor attribute at a time on each of the active devices supporting the given sensor. For example, when temperature is selected, each device that supports a temperature sensor has the most current reading of that sensor presented. In conjunction with the physical representation afforded by the map view, this may enable a presentation of the two-dimensional "field" associated with the given sensor. The map view may also allow very rapid selection of different sensors readings via a context menu, allowing a user to quickly cycle between the values of different sensors without needing to open additional windows. For sensor types that have potentially different units of measurement (degrees C. versus degrees F., ft/min versus meters/min), the view appropriately converts all sensor values to the unit of measurement most appropriate to the locale and preferences of the user, even when the data actually supplied by the different devices is natively in different units (degrees C. from one device, degrees F. from another).

The map may also use map colorization. Map colorization refers to the ability to use color to represent sensor readings for an environment. This can be as simple as putting the sensor reading of the device on the icon or changing the color of the icon to represent a sensor threshold range. Also the background of the map surrounding the icons may look like a contour plot to display sensor readings from around the room.

Figure 8A:
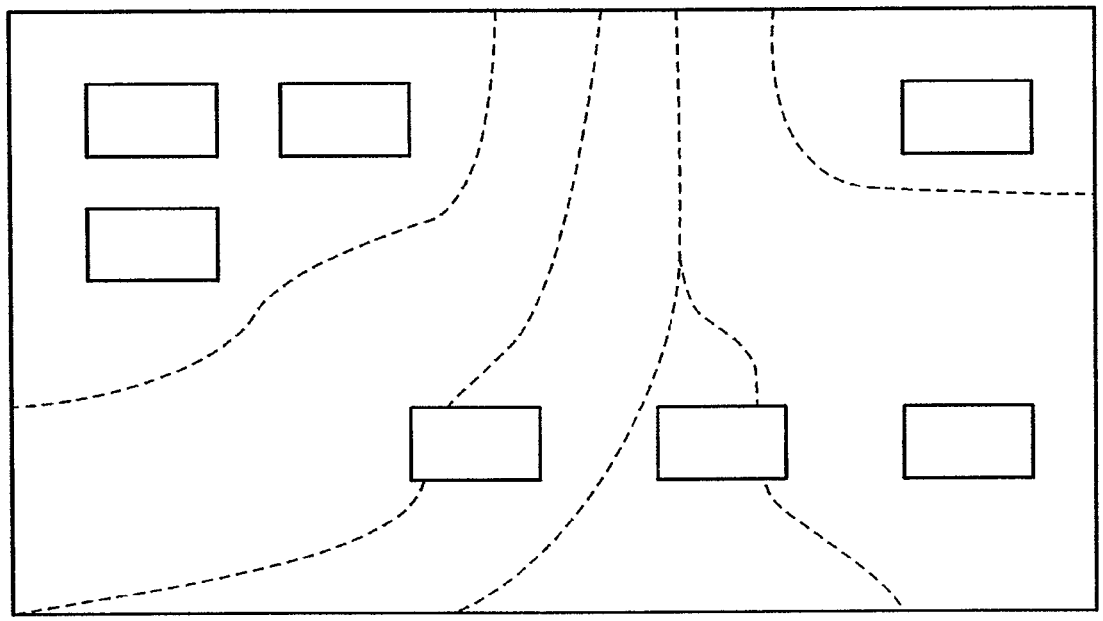
FIG. 8A is a diagram of an exemplary embodiment of a display, according to the invention.

FIG. 8A is a diagram of an exemplary embodiment of the display. As seen, icons may be arranged on the display. The arrangement may be indicative of a location in a room, for example. A background image may be a contour plot. For example, the contour plot may indicate temperature in various regions of the room.

The contour plot may be calculated from values associated with the network appliances. For example, the network appliances may be coupled to sensors in various locations. Data from these sensors may be used in determining the contour plot. For example, the contour plot may use an weighting technique based on the value of some of the sensors.

Figure 8B:
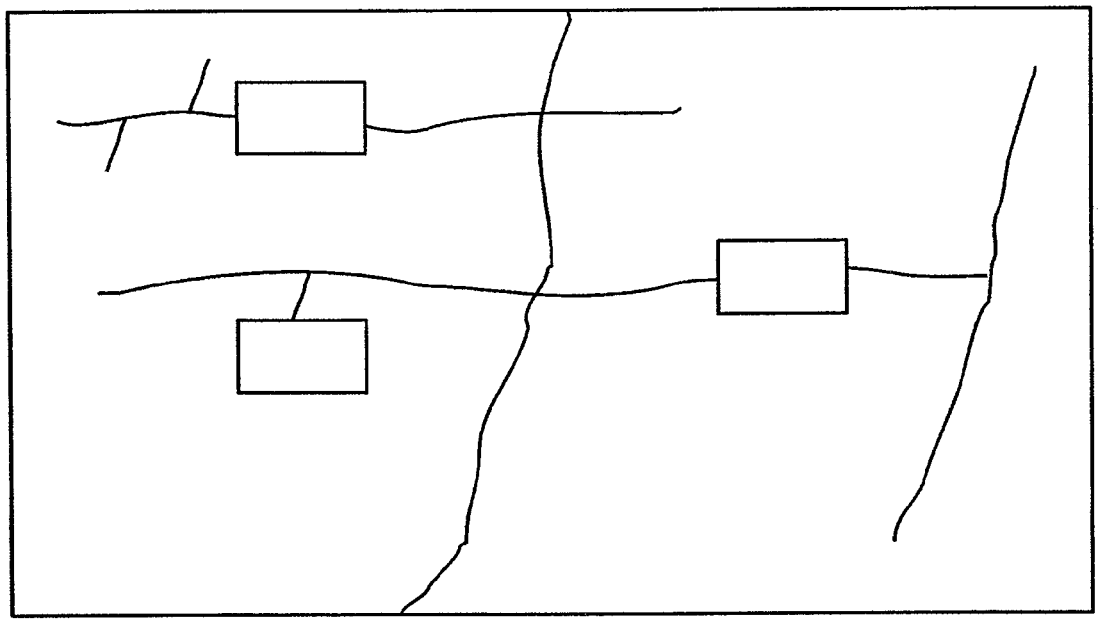
FIG. 8B is a diagram of an exemplary embodiment of a display, according to the invention.
Figure 8C:
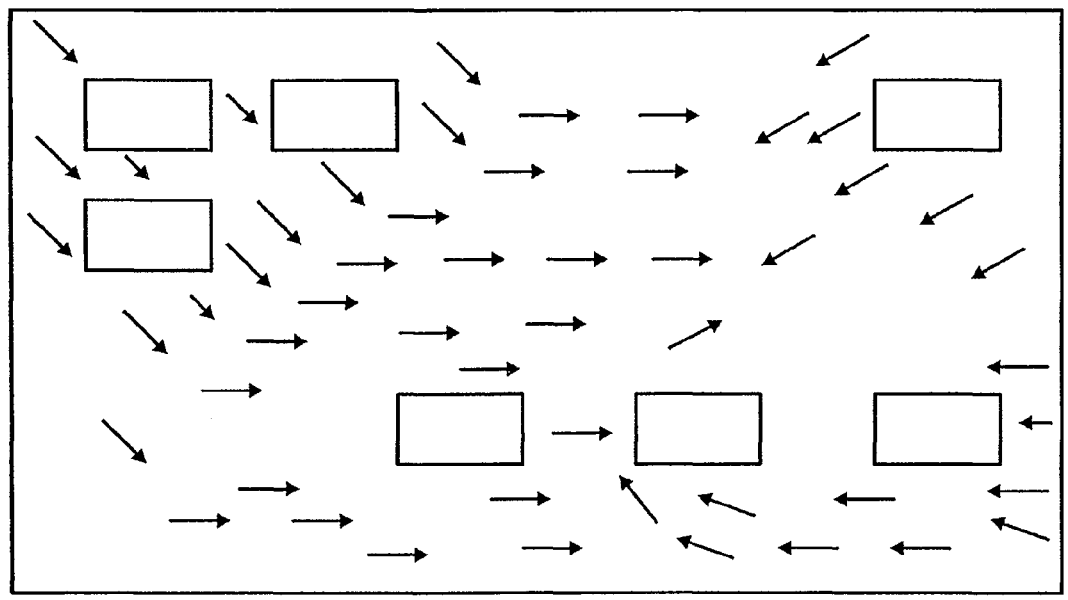
FIG. 8C is a diagram of an exemplary embodiment of a display, according to the invention.

In an alternate example, FIG. 8B shows the icons superimposed on a map. However, a blueprint of a room may also be used. Further, FIG. 8C shows a vector plot. For example, air flow throughout the room may be represented in a vector plot. However, the vector plot may represent other data. For example, the vector plot may represent sonic data. Further the vector plot may be calculated. For example, the vector plot may be determine using a weighting of data associated with sensors.

In addition, the vector plot may be combined with a contour plot. This combination may show a single measurement type such as temperature or airflow. Alternately, a temperature contour plot may be combined with an airflow vector plot. However, these plots may be combined in various configurations. Further, the plots may be combined with maps, images, and blueprints, among others. Various combinations may be envisaged.

Further, the icons may be associated with groups. For example, the map as shown in FIG. 8B may have icons representing groups. Upon selection of a group, the display may change to give detail of the group. For example, the display may switch to appear like FIG. 8A.

Figure 8D:
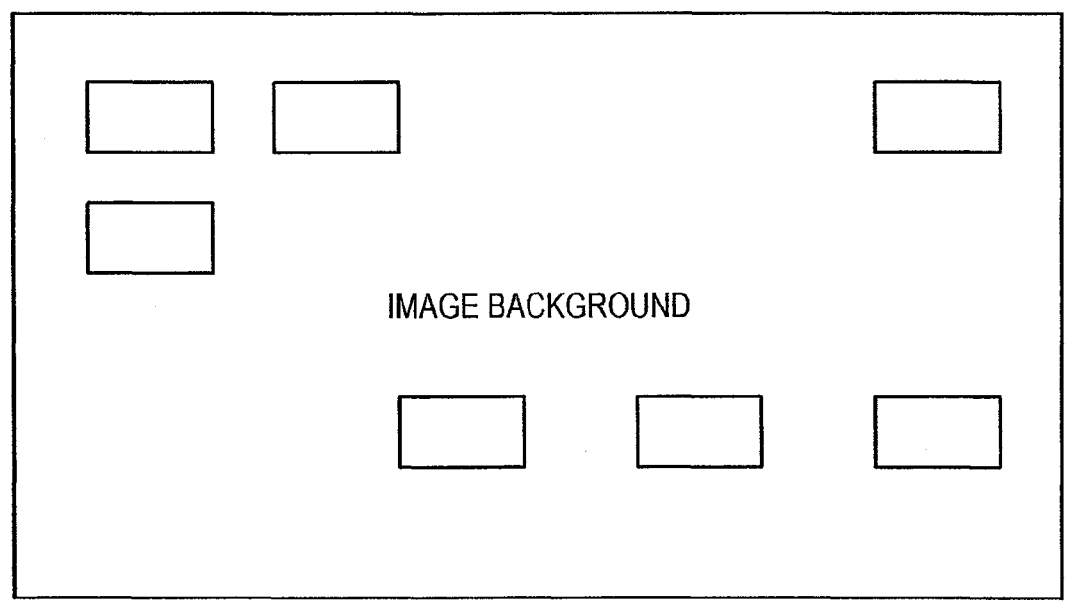
FIG. 8D is a diagram of an exemplary embodiment of a display, according to the invention.

FIG. 8D shows icons superimposed on an image this may be a static image, a video image, a live image, or others. For example, network appliance icons may be superimposed on an image of a rack. The image may be acquired, real time, by another network appliance. The image may change as new images are available. Alternately, the image may change with events, alarms or alerts, among others.

Figure 9A:
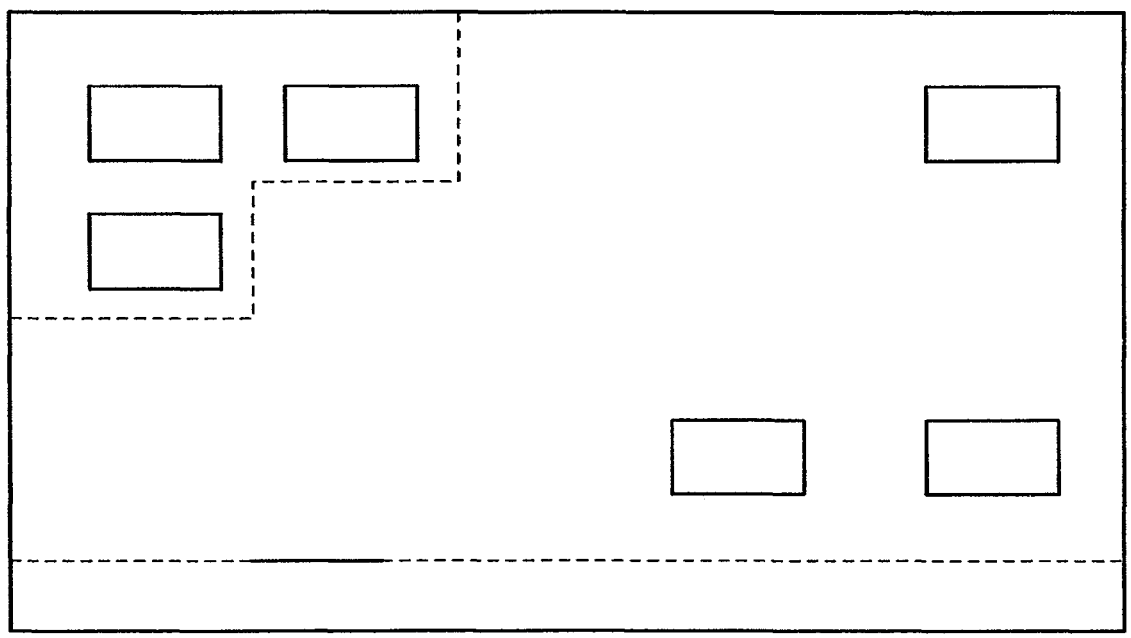
FIG. 9A is a diagram of an exemplary embodiment of a display, according to the invention.
Figure 9B:
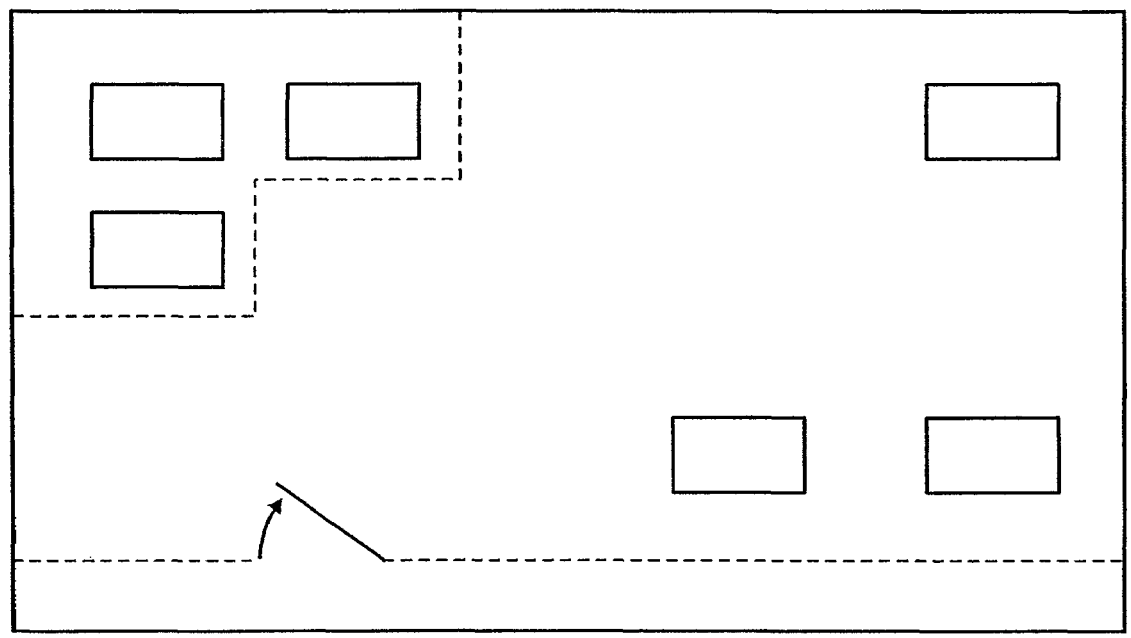
FIG. 9B is a diagram of an exemplary embodiment of a display, according to the invention.

In another exemplary embodiment, FIG. 9A shows the icons superimposed on a blueprint or image of a room. Once an event occurs, the background may change to indicate the event. For example, using a blueprint as seen in FIG. 9A, the background may be changed to indicate an door opening event as seen in FIG. 9B. However, the background may change with various events and various graphics may be swapped in the background.

In a further exemplary embodiment, a client machine may display a plot in the background. However, the plot may be swapped for a blueprint or image upon an event such as, for example, a door opening.

Another implementation of present invention may include support for a variety of enclosures, such as equipment racks and cabinets, that will allow presentation of multiple devices stacked vertically at the same location. Map Colorization of these enclosures will allow sensor reading to be presented with respect to vertical positioning, as well as horizontal. In addition, the vertical positions will enable the presentation on the standard Map View of sensors values for a given "slice" of the room (i.e. all temperature sensors at the top of the racks, the middle of the racks, or under the raised floor).

Additional use of the feature could allow the presentation of various attributes generated from multiple related sensors in the same enclosure. For example, each rack could be displayed with the temperature delta between the temperature reading of the cool air flowing into the rack versus the exhaust temperature.

The map view may also auto-sort by alarm severity. For example, environmental sensor alarms may be sorted to be displayed at the top of the map, followed by network connectivity alarms, and lastly by devices that are not in alarm state.

The display string for each icon may be user configurable to vertically display a customizable user-friendly "name" for each device. The devices that are red may have environmental sensor alarms, the devices that are yellow may have network connectivity alarms, and the gray devices may be in a normal state. The colors may be user customizable. In the colorized mode, the display string may show the alarm status.

This ordering and representation allows the user to quickly determine which devices need attention, even in a group containing hundreds or thousands of devices, since the user can quickly look at the first devices listed and know which devices need attention. Also, the user can quickly conclude by the fact that the first device listed has no errors that none of the other devices currently do.

Figure 10:
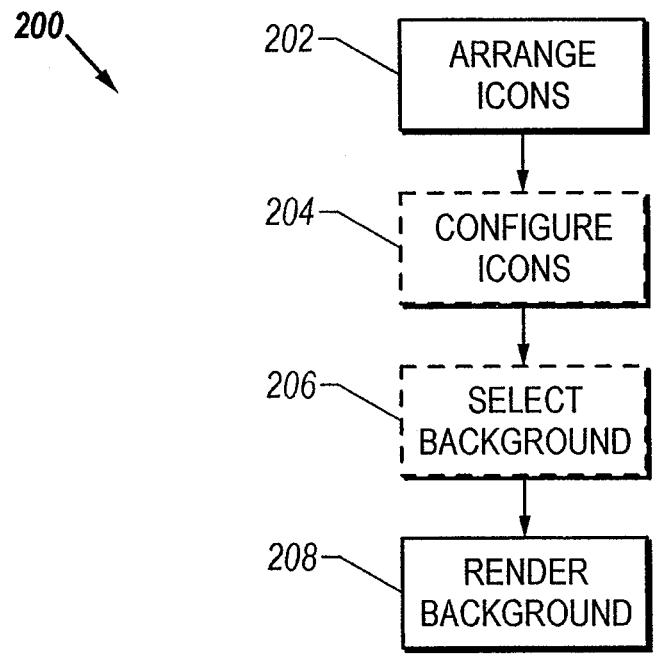
FIG. 10 is a block flow diagram of an exemplary embodiment of a method for use by the system of FIG. 1.

FIG. 10 is a block flow diagram of an exemplary method for use in the system as seen in FIG. 1. The icons may be arranged as seen in a block 202. They may be arranged automatically by associated group. Alternately, they may be arranged by a user. A user may or may not configure the icons as seen in a block 204. For example, the user may configure the colorization of the icons, the icon response to sensor values, events, and alarms, and the characteristic upon which the arrangement of the icons is determined, among others.

In addition, the user may or may not select a background as seen in a block 206. This background may be a map, blueprint, plot, or image, among others. The system may then render the background. The background may be calculated on a server or determined on the client machine. Further, the image may be stored on the server or client machine, among others. Further, configuration data associated with the display may be stored on the client machine or server, among others.

In one exemplary embodiment, the client machine obtains an application from the server for displaying data associated with a group of network appliance. Icons are arranged in a display area in accordance with location of network appliances in a room. A contour plot background is selected. The contour plot is determined by the client machine and rendered in the display area such that the icons are superimposed on the contour plot. However, the plot may have been determined at the server. Further, other backgrounds may have been determined.

Figure 11:
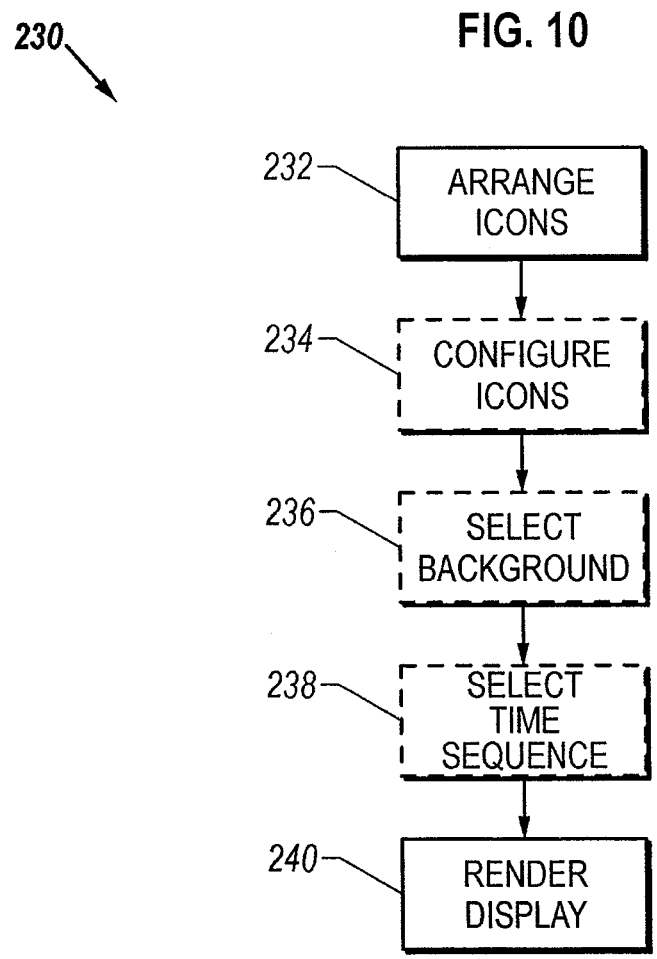
FIG. 11 is a block flow diagram of an exemplary embodiment of a method for use by the system of FIG. 1.

FIG. 11 is a block flow diagram of another exemplary method for use by the system of FIG. 1. As seen in FIG. 10, the icons may be arranged and configured as seen in the blocks 232 and 234. Further, a background may or may not be selected as seen in a block 236.

In the method 230, however, a period of time may be selected for which historical data exists for the associated network appliances. This data may then be rendered by periodically changing the background and/or visual indications of the icons in accordance with subsequent data taken from a sequence of data associated with the time period. In this manner, historical data may be replayed. Alternately, the display may be updated as new data becomes available from network appliances.

Figure 12A:
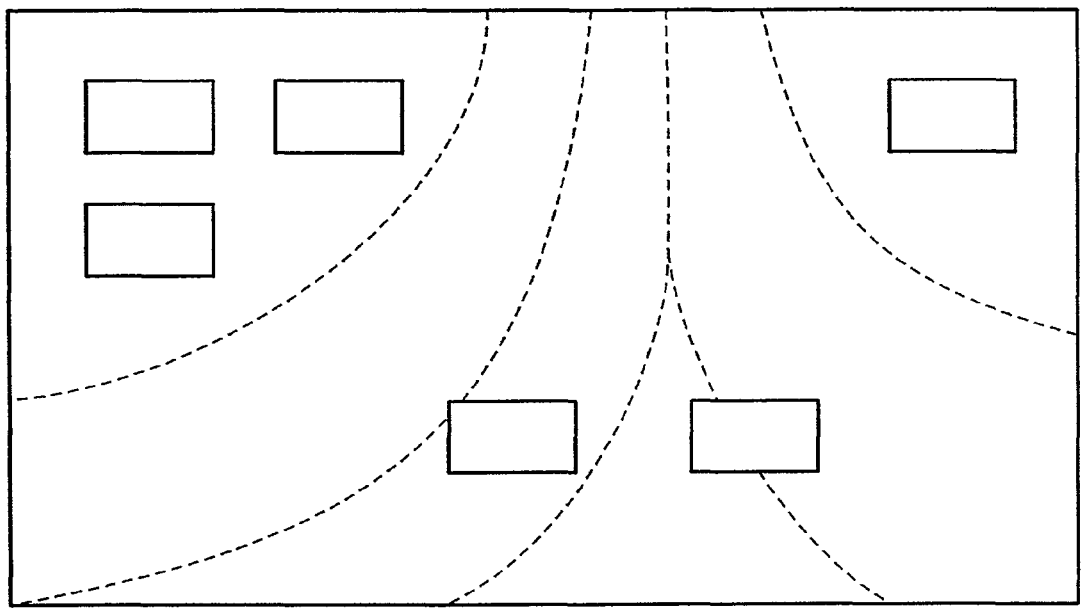
FIG. 12A is a diagram of an exemplary embodiment of a display, according to the invention.
Figure 12B:
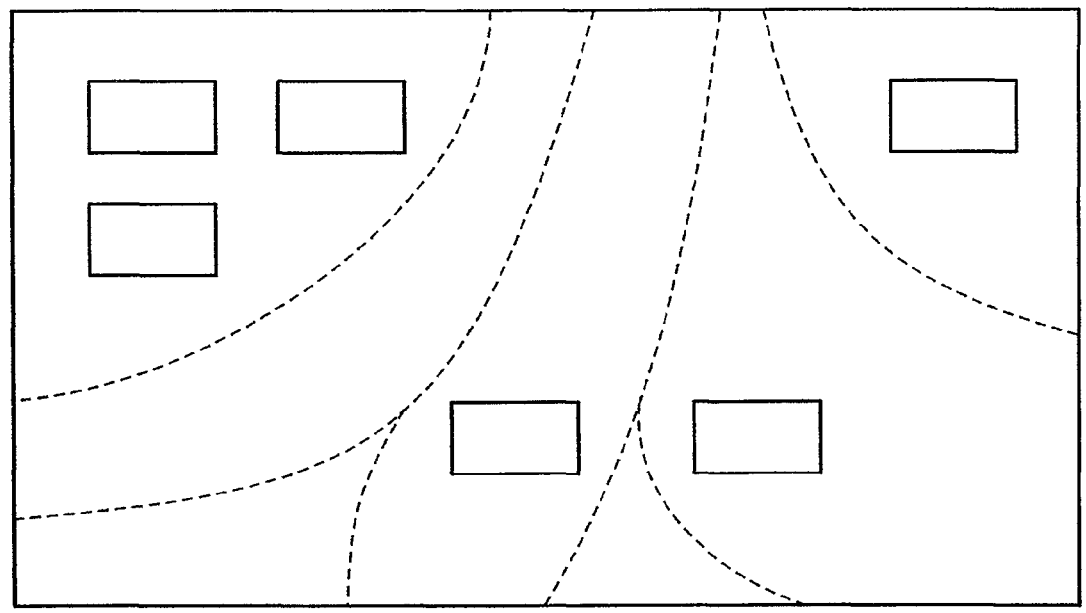
FIG. 12B is a diagram of an exemplary embodiment of a display, according to the invention.

FIG. 12A is a diagram of icons superimposed on a contour plot. For example, the plot may represent temperature in a room. Some event or circumstance may alter the temperature throughout the room. For example, a door may open, the sun may shine through a window, or the air conditioner may turn on, among others. Consequently, the temperature may change and the display may be updated as seen in FIG. 12B.

Figure 13A:
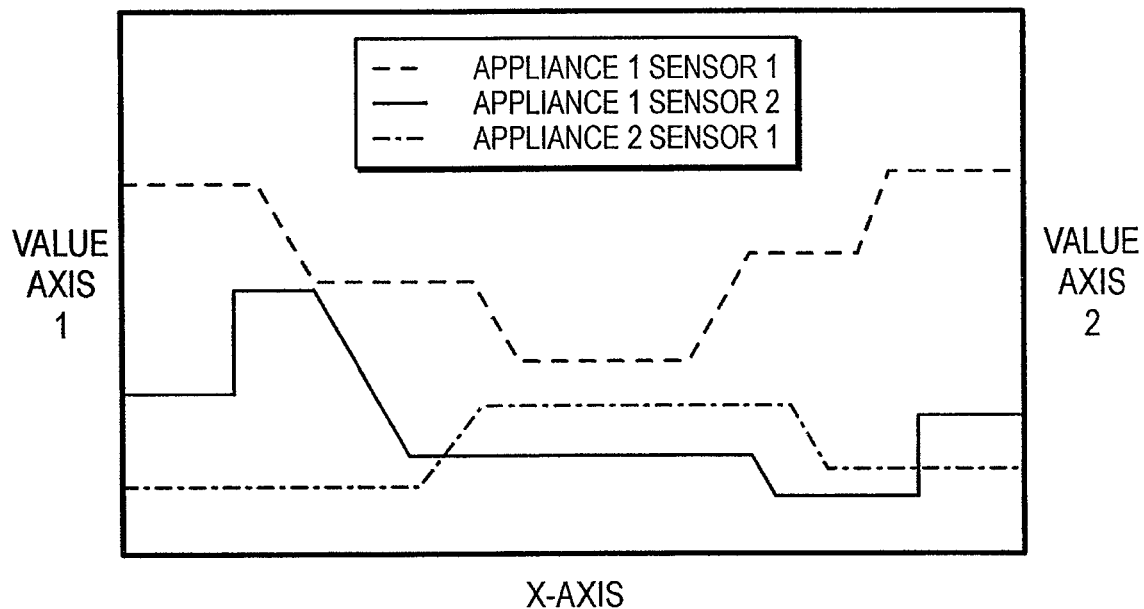
FIG. 13A is a diagram of an exemplary embodiment of a display, according to the invention.

Data associated with network appliances may also be displayed as a graph as seen in FIG. 13A. The graph may display the same type of data for several network appliances, various data from various sensors for the same appliance, or various combinations, among others. The graph may be composed of historical data or may be updated as new data is available. Further, the graph may replay data, changing the graph to represent a next value in a series of values according to an accelerated schedule.

To compact the amount of data the server stores overall, a schema may be implemented to only store the changes in the environment. For example, if the system collected data from an Appliance every 10 minutes, and the temperature of the room was constant for over an hour creating a data point for each collection interval may increase the size of the stored data. Instead, only the changes may be recorded so the environment can be played-back to the user in as efficient a manner as possible. Since most environmental sensors tend to change value slowly and infrequently, this enables a significant reduction in the amount of data stored in the database of the present invention without any loss of resolution and accuracy: storing 100 rows, 1 per minute, indicating the same temperature reported by the same sensor is no more accurate or detailed (but consumes significantly more data) than one row reporting that the sensor was a given temperature for the 100 minutes between two points in time. This compaction of the recorded sensor data enables significantly more data to be recorded for more appliances for a longer time (estimates are 20-100 times as much as a conventional 1 sample per row schema). Each row may include both a starting timestamp and an ending timestamp, allowing easy creation of SQL queries requesting sensor readings at any given time (i.e. SELECT*WHERE ((START_TIME<=T) AND (END_TIME>=T));). Moreover, this method of selecting, retrieving and/or representing data may be used for any representation of data, including the mapping with icons.

The graphs may be depicted based on a time range and a set of particular sensor readings. Allowing more than one appliance to be graphed at a time allows users to physically view the patters of environmental changes as well as compare one area of a location against another. The graphs themselves may be organized by day, week, month, or for the entire time range provided. These graphs may then be saved as in a graphic format, such as, a JPEG, GIF, or BMP file, among others, for email and/or reports, or can be exported as comma-delimited text to another utility of the users choosing.

The graphs may also include markers indicating any alerts associated with the displayed sensor on the selected appliances. These markers may appear on the line graph at the point in time where the alarm was reported or on an axis, among others. Different markers may be used for alarms reporting errors versus alarms reporting the return-to-normal of a previously out-of-bounds sensor reading For example, a solid bullet may be used for errors, and an open bullet for return-to-normal alarms. This feature allows a concise and comprehensive view of the history of a given sensor on a set of appliances, both including the recorded data and highlighting the important events associated with that history.

Since some environment changes can be radically different than others, the graph view may implement zooming in on a particular set of data points. This provides the user with a more detailed graph of a smaller time range. Just like the other graphs, a zoomed-in graph can then be saved to a graphic format for email or exported as a comma delimited file for use in another application.

When the graph zoom is activated, the time and sensor units scales may be appropriately recomputed based on the selected range. In addition, the legend associated with the graph may be reduced to just include those appliances that have sensor data contained within the zoom window, allowing the zoom view to be effectively used to pull detailed information out of a graph containing more lines of data than could typically viewed effectively.

Figure 13B:
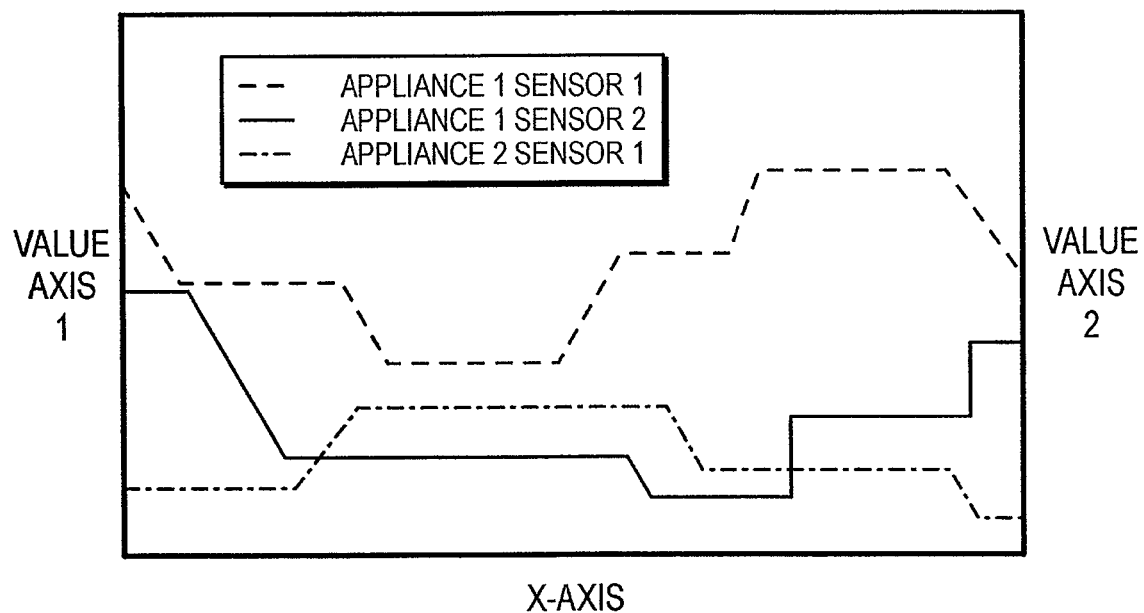
FIG. 13B is a diagram of an exemplary embodiment of a display, according to the invention.

Further, the graph may be updated as new data arrives. Alternately, a time sequence of data may be selected. The graph may be periodically changed in accordance with subsequent values in the time sequence of data. For example, FIG. 13B shows a time step update of the graph shown in FIG. 13A.

Figure 14:
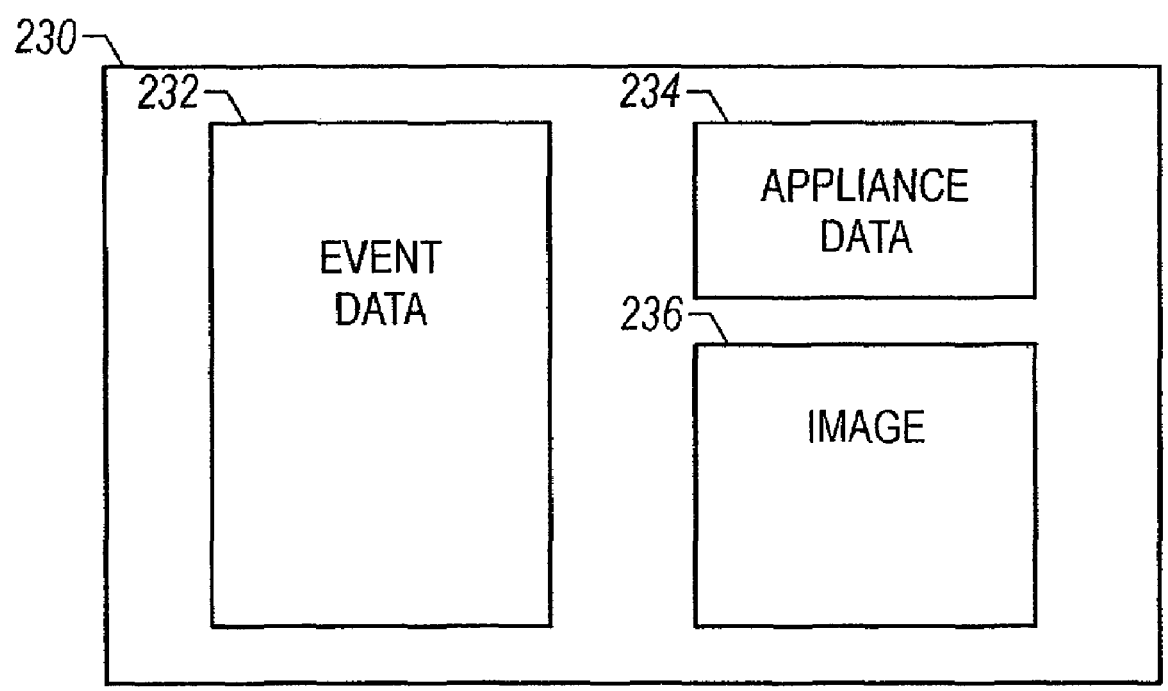
FIG. 14 is a diagram of an exemplary embodiment of a display, according to the invention.

In addition, data may be displayed and/or manipulated in other formats. For example, FIG. 14 shows a display for image data. The display area 230 may show an image. The image may be associated with an event such as, for example, a door sensor, an alarm, or a specified time, among others. The image 136 may be displayed with event data 232 and/or appliance data 234. However, more than one image may be displayed. A series of images may be displayed from a single appliance. Alternately an array of images from several network appliances.

Furthermore, the image may be updated as new images are available. This update may be accomplished by periodic requests from the client machine to the server. Alternately, the server may forward data to the client as it arrives. Alternately, a time sequence of images may be displayed. For example, a historical set of images may be chosen for display.

Figure 15A:
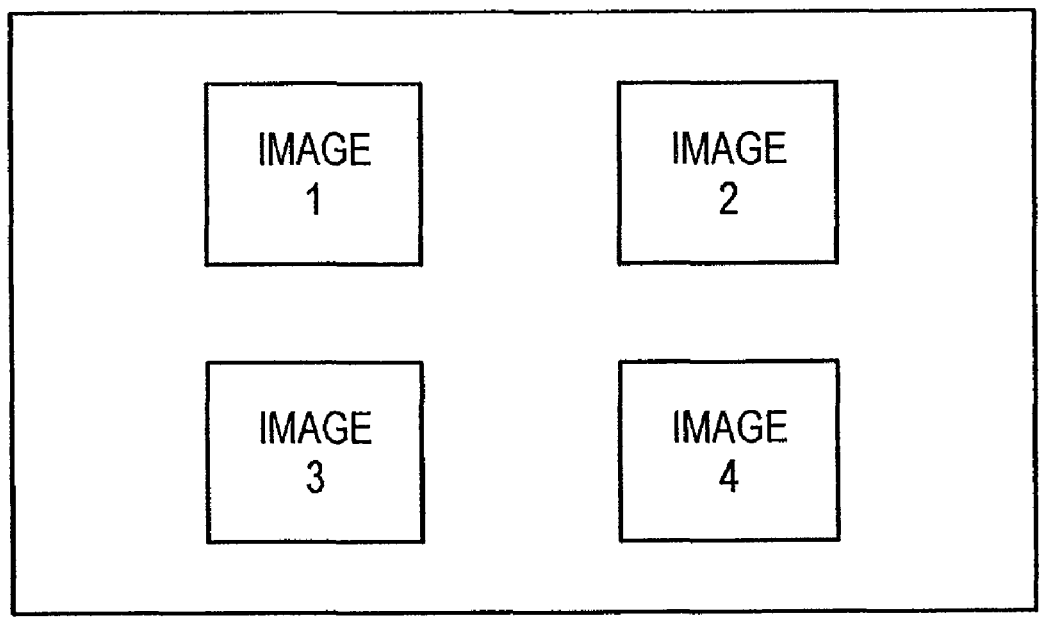
FIG. 15A is a diagram of an exemplary embodiment of a display, according to the invention.
Figure 15B:
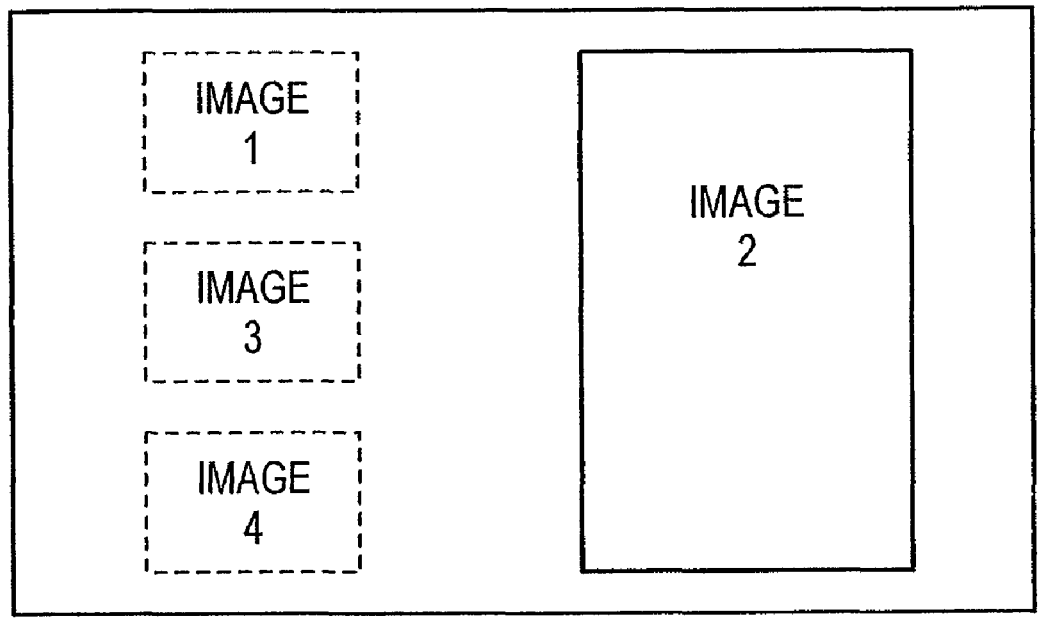
FIG. 15B is a diagram of an exemplary embodiment of a display, according to the invention.

In an alternate embodiment, an array of images may be displayed as seen in FIG. 15A. These images may take the form of icons. The images may also be updated with new images or replay historical data. Further, the images may be active in that a user behavior such as, for example, a click may enlarge the image or transition to another display mechanism. For example, FIG. 15B shows an enlargement of image 2. Other images in the display may be removed or made smaller, among others.

As such, a system and method for displaying data associated with network appliances is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. An environmental monitoring system comprising:
a network;
a plurality of appliances, each of the plurality of appliances including:
a network interface;
at least one environmental sensor;
a data storage medium; and
a processor coupled to the network interface, the at least one environmental sensor; and the data storage medium and configured to:
receive environmental data from the at least one environmental sensor;
store the environmental data on the data storage medium; and
provide the environmental data via the network; and
a server including:
a network interface; and
a processor coupled to the network interface, the processor configured to:
receive environmental data from each of the plurality of appliances;
cause display of a graphical element including at least one of a vector plot and a contour plot; and
cause display of a plurality of icons superimposed on the graphical element, the plurality of icons associated with the plurality of appliances, the plurality of appliances associated with a category, the plurality of icons arranged on the display in accordance with a characteristic associated with the plurality of appliances.

2. The system according to claim 1, wherein the includes a contour plot indicates variances in the environmental data.

3. The system according to claim 2, wherein the contour plot is associated with temperature data.

4. The system according to claim 2, wherein the contour plot is associated with airflow data.

5. The system according to claim 1, wherein the graphical element includes the vector plot and the contour plot.

6. The system according to claim 1, wherein the characteristic includes a physical location.

7. The system according to claim 1, wherein the characteristic includes an alarm state.

8. The system according to claim 1, wherein the category includes a responsible party.

9. The system according to claim 1, wherein the category includes a location.

10. A method of monitoring an environment including a plurality of appliances, the method comprising:
receiving environmental data from at least one environmental sensor included in an appliance of the plurality of appliances;
storing the environmental data on a data storage medium included in the appliance;
providing the environmental data to a network via a network interface included in the appliance;
receiving the environmental data via a network interface included in a server;
displaying, via the server, a graphical element including at least one of a vector plot and a contour plot; and
displaying, via the server, a plurality of icons superimposed on the graphical element, the plurality of icons associated with the plurality of appliances, the plurality of appliances associated with a category, the plurality of icons arranged on a display in accordance with a characteristic associated with the plurality of appliances.

11. The method according to claim 10, wherein displaying, via the server, the graphical element includes displaying a contour plot that indicates variances in the environmental data.

12. The method according to claim 11, wherein displaying, via the server, the contour plot includes displaying a contour plot that is associated with temperature data.

13. The method according to claim 11, wherein displaying, via the server, the contour plot includes displaying a contour plot that is associated with airflow data.

14. The method according to claim 10, wherein displaying, via the server, the graphical element includes displaying the vector plot and the contour plot.

15. The method according to claim 10, wherein displaying, via the server, the plurality of icons includes displaying a plurality of icons arranged on the display in accordance with a physical location.

16. The method according to claim 10, wherein displaying, via the server, the plurality of icons includes displaying a plurality of icons arranged on the display in accordance with an alarm state.

17. The method according to claim 10, wherein displaying, via the server, the plurality of icons includes displaying a plurality of icons associated with a responsible party.

18. The method according to claim 10, wherein displaying, via the server, the plurality of icons includes displaying a plurality of icons associated with a location.

19. An environmental monitoring system comprising:
a network;
a plurality of appliances, each of the plurality of appliances including:
   a network interface;
   at least one environmental sensor;
   a data storage medium; and
   a processor coupled to the network interface, the at least one environmental sensor and the data storage medium and configured to:
      receive environmental data from the at least one environmental sensor;
      store the environmental data on the data storage medium; and
      provide the environmental data via the network; and
means for displaying a plurality of icons superimposed on a graphical element including at least one of a vector plot and a contour plot, the plurality of icons associated with the plurality of appliances, the plurality of appliances associated with a category, the plurality of icons arranged on the display in accordance with a characteristic associated with the plurality of appliances.

20. The system according to claim 19, wherein the means for displaying the plurality of icons includes means for displaying a plurality of icons superimposed on a contour plot and a vector plot.

* * * * *

UNITED STATES PATENT AND TRADEMARK OFFICE
CERTIFICATE OF CORRECTION

| | | |
|---|---|---|
| PATENT NO. | : 8,224,953 B2 | Page 1 of 1 |
| APPLICATION NO. | : 12/029042 | |
| DATED | : July 17, 2012 | |
| INVENTOR(S) | : Sloan K. Childers et al. | |

It is certified that error appears in the above-identified patent and that said Letters Patent is hereby corrected as shown below:

In the Claims:

Column 18, Claim 2, Line 35 – remove "includes a".

Signed and Sealed this
Twenty-fifth Day of December, 2012

David J. Kappos
*Director of the United States Patent and Trademark Office*